United States Patent
Wondra et al.

(10) Patent No.: US 11,412,289 B2
(45) Date of Patent: Aug. 9, 2022

(54) SYSTEMS AND METHODS FOR PROVIDING SYNCHRONIZED SUPPLEMENTAL CONTENT TO A SUBSET OF USERS THAT ARE DISINTERESTED IN LIVE CONTENT

(71) Applicant: Rovi Guides, Inc., San Jose, CA (US)

(72) Inventors: Dylan Matthew Wondra, Mountain View, CA (US); Jean Michelle Somlo, Sunnyvale, CA (US); Michaela Schlocker Logan, San Jose, CA (US); Mario Miguel Sanchez, San Jose, CA (US); William L. Thomas, Evergreen, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/254,988

(22) PCT Filed: Jun. 29, 2018

(86) PCT No.: PCT/US2018/040354
§ 371 (c)(1),
(2) Date: Dec. 22, 2020

(87) PCT Pub. No.: WO2020/005277
PCT Pub. Date: Jan. 2, 2020

(65) Prior Publication Data
US 2021/0274244 A1  Sep. 2, 2021

(51) Int. Cl.
*H04N 21/43* (2011.01)
*H04N 21/2187* (2011.01)
*H04N 21/472* (2011.01)
*H04N 21/478* (2011.01)
*H04N 21/845* (2011.01)

(52) U.S. Cl.
CPC ... *H04N 21/43072* (2020.08); *H04N 21/2187* (2013.01); *H04N 21/43076* (2020.08); *H04N 21/478* (2013.01); *H04N 21/47217* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |
| 7,802,285 B2 | 9/2010 | Ellis et al. |

(Continued)

OTHER PUBLICATIONS

International Search Report and Written Opinion of PCT/US/2018/040354 (15 pages).

*Primary Examiner* — Heather R Jones
(74) *Attorney, Agent, or Firm* — Haley Guiliano LLP

(57) ABSTRACT

Systems and methods are described herein for providing supplemental content to a group of users when the group of users is disinterested in content from a live content stream. When users are disinterested in a segment of the live content, the users will be provided with supplemental content to consume during the not interesting portion of the live content while other users that are viewing the live content will continue to receive the live content stream. After the segment of the live content is completed, the group of users will resume consumption of the live content stream.

21 Claims, 9 Drawing Sheets

(56) References Cited

U.S. PATENT DOCUMENTS

| | | |
|---|---|---|
| 2002/0174430 A1 | 11/2002 | Ellis et al. |
| 2005/0028208 A1 | 2/2005 | Ellis et al. |
| 2005/0251827 A1 | 11/2005 | Ellis et al. |
| 2011/0137976 A1* | 6/2011 | Poniatowski .... H04N 21/42203 707/769 |
| 2017/0251260 A1* | 8/2017 | Sanders ........... H04N 21/47217 |
| 2018/0124144 A1* | 5/2018 | Gonzalez ............. H04N 21/251 |
| 2018/0220198 A1* | 8/2018 | Matthews .......... H04N 21/4661 |

\* cited by examiner

700

702
Determine a plurality of users that are viewing live content from an over-the-top (OTT) provider.

704
Determine a subset of the plurality of users that have partially progressed through a synchronized viewing of a collection of non-live content from the OTT provider.

706
Determine an intersection of preferences of each user of the subset.

708
Determine, based on the intersection of preferences, that the live content has reached a segment that is uninteresting to the subset.

710
In response to determining that the live content has reached the segment that is uninteresting to the subset, play back the synchronized viewing of the collection from a bookmarked progress point within the collection to each user of the subset, while continuing to play back the live content to other users of the plurality of users who are not part of the subset.

1102
Retrieve, based on the metadata from each respective profile, respective viewing histories comprising a plurality of media assets viewed by each user of the subset of users.

1104
Identify, based on the respective viewing histories, respective characteristics corresponding to the plurality of media assets in the respective viewing histories for each user of the subset of users.

1106
Identify a characteristic matching at least one of the respective characteristics corresponding to the plurality of media assets in the respective viewing histories for each user of the subset of users.

FIG. 11

ABSTRACT# SYSTEMS AND METHODS FOR PROVIDING SYNCHRONIZED SUPPLEMENTAL CONTENT TO A SUBSET OF USERS THAT ARE DISINTERESTED IN LIVE CONTENT

CROSS-REFERENCE TO RELATED APPLICATIONS

This application is a national stage application under 35 U.S.C. § 371 of International Application PCT/US2018/040354, filed Jun. 29, 2018, which is hereby incorporated by reference herein in its entirety.

BACKGROUND

Oftentimes, users may watch live content but may not be interested in all parts of the live content. For example, users may watch a live football game, such as the Super Bowl; some users may be interested in viewing the game while the players are on the field, while other users may be interested in viewing the game while the players are not on the field, such as during the commercials. When a portion of the live content is disinteresting to a user, the user may become distracted from viewing the live content and may miss parts of the live content that the user finds interesting. For example, a user who is disinterested in Super Bowl commercials may begin text messaging a group of his or her friends, who also dislike commercials, while the commercials are playing. The group of users may become engaged in the texting conversation about a television program that the group of users watches, which wastes time that could be spent viewing the television program, and may also distract the users from live content that they find interesting (e.g., the football game).

SUMMARY

Accordingly, it is advantageous to connect those users who are disinterested in live content and who perform a synchronized viewing media group to provide those users with a synchronized viewing of non-live content during a lull in the live media so that those users remain engaged with their media consumption environment and do not become distracted from content that is of interest to the users. The advancement of digital transmission of media content has increased the amount of data that can be transmitted between content providers and user equipment. In particular, content providers can transmit and receive metadata associated with media and/or profiles associated with users and determine when a user is interested or disinterested in content. While this information, by itself, is not useable for displaying to a human user, computer processors can read and interpret this information to generate content for display to a human user. However, while computer processors may read and interpret this information, these systems fail to solve the aforementioned problem when implemented on computer systems because they simply provide supplemental content to a single user based on that single user's interests.

Accordingly, systems and methods are described herein for a media guidance application that replaces a segment of live content from an over-the-top (OTT) provider with a segment of non-live content from the OTT provider for a subset of users that are both disinterested in the segment of live content and also part of a same synchronized viewing group. For example, a media guidance application may provide to the subset of users alternative non-live content to replace a segment of the live OTT content that is not of interest to the subset of users. Once the segment of non-live OTT content that is not of interest to the subset is complete, the media guidance application may return to the live OTT content for the subset of users. Accordingly, the subset of users remain interested in the live-OTT content because the media guidance application provides replacement content to the subset of users, such as a synchronized viewing of non-live OTT content, when the users are disinterested in the segment of live OTT content. The media guidance application may continue to transmit to the other users the live OTT content so that the users that are interested in the segment of the live OTT content may continue viewing the live OTT content without interruption.

For example, a plurality of users may be viewing live OTT content, such as a stream of a live sports game. The media guidance application may identify a subset of the plurality of users that have progressed through a synchronized viewing of a collection of non-live content from the OTT provider. For example, the media guidance application may identify a group of users who participate in a weekly viewing session for a non-live television series from the OTT provider, such as a subset of users that watch an episode of a media asset (e.g., "The Wire") every week. The media guidance application may determine whether the users of the group are interested in the segment of the live OTT content, and when the media guidance application determines that the users of the group are not interested in the segment of the live OTT content, may replace the segment of the live OTT content with a portion of non-live OTT content (e.g., content from the television series The Wire or other media that is of interest to the group of users).

For example, when the media guidance application determines that the users are not interested in the segment of live OTT content (e.g., a portion of the live game during a time out), the media guidance application may transmit to the group of users a portion of The Wire beginning at a point subsequent to the last synchronized viewing session. For example, the media guidance application may determine that the group of users consumed up to the 30 minute mark within a second episode of The Wire during the most recent synchronized viewing session for the group of users. The media guidance application may transmit to the group of users a portion of the second episode of The Wire beginning at the 30 minute mark so that the group of users can continue the synchronized viewing session from a point at which the group of users last left off. The media guidance application may continue to transmit to the other users (e.g., the users who are not in the group) the segment of the live OTT content so that those users can continue viewing the live OTT content without interruption.

In some aspects, the media guidance application may determine a plurality of users that are viewing live content from an OTT provider. For example, the media guidance application may access a database of the OTT provider that identifies all active streams of live OTT content, such as a live football game. The media guidance application may identify a user associated with each of the active streams based on correlating subscriber data from the OTT provider with the identified active streams.

The media guidance application may retrieve a respective profile corresponding to each user of the plurality of users from a database. For example, the media guidance application may identify each user associated with an active stream of the live OTT content and may correlate a unique identifier for each user of the plurality of users with a database storing an association between the unique user identifier and the user profile. Based on identifying a user profile associated with each user of the plurality of users, the media guidance application may retrieve respective metadata associated with each respective profile. For example, the media guidance application may retrieve respective preferences of each respective user from each respective profile of the plurality of profiles.

The media guidance application may determine, based on the metadata from each respective profile, a subset of the plurality of users that have partially progressed through a synchronized viewing of a collection of non-live content from the OTT provider. For example, the media guidance application may identify, based on the metadata, a viewing progress for a first user user for other content (e.g., non-live content) in a content library of the OTT provider. The media guidance application may retrieve metadata associated with a second user that comprises a viewing progress for the second user for other content in the content library of the OTT provider. The media guidance application may determine, based on the viewing progress associated with the first user and the viewing progress associated with the second user, that the first user and the second user have viewed up to a same progress point. For example, the media guidance application may determine that a group of users has progressed to a same progress point in the television series The Wire based on the viewing progress stored in the metadata of the respective user profiles.

In some embodiments, the media guidance application may utilize social network data and a viewing progress to determine whether users of the plurality of users are part of a synchronized viewing of a media asset. For example, the media guidance application may identify, based on the metadata from each respective profile, a first group of users of the plurality of users having a same viewing progress in the collection of non-live OTT content. For example, the media guidance application may retrieve, from the metadata a viewing progress for various media assets in a media content library for the OTT content provider. The media guidance application may compare the viewing progress for the various media assets for the plurality of users to identify a group of users having a same viewing progress for a media asset. For example, the media guidance application may identify, from the plurality of users viewing the live football game, the group of users who have viewed up to episode three in the television series The Wire. The media guidance application may identify, based on the metadata from each respective profile, the subset of users from the group of users based on a determination that the subset of users are linked via a same social network. For example, the media guidance application may identify the subset of users from the group based on a determination that the subset of users are each included in a chat group directed to discussing the television series The Wire, and they also have reached a same progress point in The Wire.

In some embodiments, the media guidance application may retrieve, from the metadata, an indication of the plurality of users included in the synchronized viewing of the collection of non-live content from the OTT provider. For example, the media guidance application may enable the users to establish a group of users for performing a synchronized viewing of the non-live OTT content. For example, the media guidance application may allow for a user to invite a user's friends to view an episode of The Wire that is synchronized with the invited user's friends. The media guidance application may identify the subset of users based on an intersection of the plurality of users simultaneously viewing the live content and the plurality of users included in the synchronized viewing of the collection. For example, the media guidance application may identify as the subset of users those users that are both viewing the live OTT content and those users that were invited to participate in the synchronized viewing of the episode of The Wire.

The media guidance application may determine respective preferences of each respective user of the subset based on the metadata from each respective profile. For example, the media guidance application may retrieve a user profile for each user of the subset and may identify, based on the user profile, a listing of media assets that were previously viewed by the respective user. The media guidance application may retrieve metadata associated with each media asset in the user's viewing history, and based on the metadata associated with the viewing history of the user, may determine a set of likes and dislikes associated with the user.

The media guidance application may determine an intersection of the respective preferences of each respective user in the subset. For example, the media guidance application may compare the respective preferences of a first user in the subset of users to those preferences of other users in the subset of users and may identify those preferences associated with the first user that are also associated with each other user of the subset of users. For example, the media guidance application may determine that each user in the subset of users likes football but does not like watching commercials during a football game (e.g., based on a determination from the user preferences that each user in the subset of users tunes away from the football game during the commercials). In response to determining that each user in the subset of users prefers watching the football game and not the commercials, the media guidance application may determine that the intersection of preferences is the football game and not the commercials during the game.

In some embodiments, the media guidance application may retrieve, based on the metadata from each respective profile, respective viewing histories comprising a plurality of media assets viewed by each user of the subset of users. For example, the media guidance application may store, in the user profile for each respective user, indications as to when a user requests a media asset, how long the user watches the media asset and/or any user interactions with the media asset (e.g., fast-forwarding, rewinding, pausing, etc.). The media guidance application may identify, based on the user profile, media assets that were previously requested by each user of the plurality of users in the subset. For example, the media guidance application may retrieve from the respective user profile of each user an array of media assets that were previously requested by the respective user from the OTT provider.

In some embodiments, the media guidance application may identify, based on the respective viewing histories, respective characteristics corresponding to the plurality of media assets in the respective viewing histories for each user of the subset of users. By comparing the characteristics of the media assets in the viewing histories of the users, the media guidance application may determine the preferences for the user (e.g., based on similar characteristics of media that was previously selected by the users.) For example, the media guidance application may retrieve, from a respective viewing history, an identifier of a media asset that was previously accessed by the user. The media guidance application may transmit the identifier of the media asset (e.g., an identifier for the television show The Wire) to a remote server comprising metadata associated with media assets to identify characteristics of the media asset. For example, the media guidance application may receive, in response to the transmitting, metadata corresponding to The Wire such as a genre, title, runtime, etc.

In some embodiments, the media guidance application may identify a characteristic matching at least one of the respective characteristics corresponding to the plurality of media assets in the respective viewing histories for each user of the subset of users. For example, the media guidance application may receive the characteristics of the media assets as described above and may compare a first characteristic for a first media asset in a first viewing history for a first user of the subset with a second characteristic of a second media asset in a second viewing history for a second user. For example, the media guidance application may determine that the television show "Game of Thrones" is in a first viewing history for a first user and the television show "The Sopranos" is in a second viewing history for a second user. The media guidance application may retrieve characteristics associated with the media assets in the viewing histories for the two users. For example, the media guidance application may retrieve a genre characteristic for Game of Thrones (e.g., drama genre) and a genre characteristic for The Sopranos (e.g., drama genre). The media guidance application may compare the two characteristics and may determine that both users like the drama genre based on the determination that both of the media assets in the viewing histories of the users are associated with the drama genre.

The media guidance application may determine an attribute of a current segment of the live content to determine whether the subset of users are interested in the current segment of the live content, and if not, provide the subset of users with alternate content. For example, the media guidance application may retrieve metadata associated with the segment of the live content and may determine, based on the metadata, an attribute of the segment. For example, the media guidance application may receive data from the OTT provider that indicates whether a current segment is part of the live football game or whether the current segment comprises commercials. Based on the retrieved data, the media guidance application may determine an attribute of the segment (e.g., a game attribute when the segment corresponds to the football game and a commercial attribute when the segment corresponds to the commercials).

In some embodiments, the media guidance application may identify a segment of the media asset and, based on identifying the segment, identify the attribute of the segment. For example, the media guidance application may identify a transition in the live content to the current segment. For example, the media guidance application may determine, based on metadata received with the video data from the OTT provider, that there was a transition from a first segment (e.g., a first scene in a movie) to a second segment (e.g., a second scene in a movie). In another example, the media guidance application may identify the transition in the live content by analyzing the video or audio data. The media guidance application may determine that there is a transition in the live content when a threshold number of pixels changes between two sequential video frames. For example, the media guidance application may identify a transition when greater than a threshold number of pixels change from green (e.g., when the live video contains a sports field) to a color other than green (e.g., when the live video is no longer showing the sports field).

In some embodiments, in response to identifying the transition, the media guidance application may generate a fingerprint of the content in the current segment based on at least one frame of the current segment. For example, the media guidance application may use a suitable algorithm to generate a fingerprint for the media asset based on at least one video and/or audio frame from the identified segment of the live OTT content. The media guidance application may compare the generated fingerprint to a database of known fingerprint-attribute pairs generated based on the same or a similar algorithm to identify an attribute associated with the segment of the live OTT content. For example, the media guidance application may identify a transition between the football game to a commercial. The media guidance application may identify the portion of the live OTT content comprising the commercial as the segment. The media guidance application may retrieve frames of the commercial and may generate a fingerprint for the commercial and may compare the fingerprint to a database of known fingerprints. The media guidance application may determine, based on the comparison, that the fingerprint corresponds to a soap commercial. The media guidance application may determine, based on the identified known content fingerprint, the attribute of the content segment. For example, the media guidance application may determine that the attributes are "commercial" and "soap" based on the determination that the fingerprint generated from the live OTT content matches a known fingerprint for a soap commercial.

In response to determining that the attribute does not match the intersection of preferences, the media guidance application may transmit to the subset of users synchronized replacement content during the segment while continuing to transmit to the other users, of the plurality of users, the live OTT content. By transmitting replacement content to the subset of users, the subset of users will likely remain engaged with the content of the OTT provider instead of becoming distracted when they are not interested in the live OTT content.

The media guidance application may retrieve, from a database, a bookmarked progress point that corresponds to the synchronized viewing. By retrieving the bookmarked progress point, the media guidance application may begin transmitting replacement content to the subset of users beginning at a point of the synchronized viewing at which the subset of viewers last consumed. For example, the media guidance application may determine that the subset of users participates in a synchronized viewing of The Wire as described above (e.g., based on the viewing history in each user's profile). Based on the determination that the users participate in the synchronized viewing, the media guidance application may retrieve a bookmark corresponding to a progress point reached by each of the users in the synchronized viewing. For example, the media guidance application may determine that each user of the subset has watched through the fourth episode of The Wire. Accordingly, the media guidance application may identify the bookmark as the beginning of the fifth episode (e.g., because all of the users have already viewed each of the episodes preceding the fifth episode).

The media guidance application may transmit to each user of the subset an identical portion of the non-live OTT content in place of the segment of the live content, beginning at the bookmarked progress point. For example, the media guidance application may begin transmitting a beginning portion of the fifth episode of The Wire to each user in the subset based on the determination that each user of the subset has watched through the fourth episode.

In some embodiments, the media guidance application may estimate the duration of the segment and may transmit the portion of the non-live OTT content to the subset of users for the duration of the segment. For example, the media guidance application may determine, based on comparing a fingerprint of the segment to the database, that the segment is two minutes long. In response to estimating the duration of the segment, the media guidance application may retrieve a portion of the non-live OTT content equal to the duration of the segment and may transmit that portion of the non-live OTT content to the segment of users. For example, the media guidance application may determine that the soap commercial is two minutes long and may accordingly transmit a two-minute portion of the fifth episode of The Wire to each of the users in the subset.

In some embodiments, the media guidance application may record a portion of the live content to accommodate a duration of the replacement content. For example, the media guidance application may select replacement content having a duration of 10 minutes (e.g., based on determining that a scene in the replacement content is 10 minutes long and based on a determination that the media guidance application should not spread the scene across multiple breaks). For example, the media guidance application may determine that the scene should not be broken up into smaller segments (e.g., based on retrieving a threshold minimum duration for replacement content). Accordingly, the media guidance application may transmit to the subset of users, the replacement content for 10 minutes. The media guidance application may begin recording a portion of the live OTT content that is of interest to the subset of users that occurs while the replacement content is being transmitted by the media guidance application to the subset of users. For example, two minutes into the replacement content, the media guidance application may determine that the live OTT content would be of interest to the subset of users. In response to the determination, the media guidance application may record the portion of the live OTT (e.g., locally on a user device or multiple user devices and/or in a server located remote to the users). The media guidance application may begin playback of the recorded live OTT content at an ending of the replacement content. For example, the media guidance application may begin transmitting the recorded portion of the live OTT content to the subset of users when the replacement content completes. The media guidance application may continue to record the live OTT content until reaching a lull in the media where the media guidance application catches up to the live OTT content.

The media guidance application may continue to transmit, to the other users of the plurality of users that are not part of the subset, the segment of the live content. For example, the media guidance application may continue to transmit the live OTT content (e.g., the commercials) to the other users of the plurality of users that are not part of the subset, while the users that are part of the subset are transmitted replacement content (e.g., the first two minutes of the fifth episode of The Wire).

In some embodiments, the media guidance application may determine whether a number of users in the subset of users matches a number of users in the plurality of users included in the synchronized viewing of the collection. For example, the media guidance application may determine the number of users included in the synchronized viewing (e.g., by determining the number of users invited to the synchronized viewing of the episode of The Wire on the social network group) and may compare that number to the number of the subset of users. When the media guidance application determines that the number of users in the subset is less than the number of users in the plurality of users included in the synchronized viewing, the media guidance application may identify a user that is not included in the subset and may allow for that user to have a private viewing session to catch up to the synchronized viewing session of the other users in the subset. For example, if the media guidance application determines that a user from the synchronized viewing is not currently viewing the live OTT content (e.g., the user is not viewing the live football game), the media guidance application may present an option to the user to catch up to any content that is viewed by the subset during the live OTT content (e.g., the portions of non-live OTT content transmitted to the subset during the segment of the live OTT content, such as the first two minutes of the fifth episode of The Wire).

In some embodiments, the media guidance application may update the bookmark in response to determining that the identified user viewed the identical portion of the non-live OTT content outside of the synchronized viewing. For example, the media guidance application may transmit to the identified user an option for the user to catch up on the identical portion that was viewed by the users in the subset during the synchronized viewing. The media guidance application may determine when the identified user views the identical portion (e.g., by identifying a user selection of the option) and may update the bookmark once the viewer has viewed the identical portion to indicate that the bookmark begins at two minutes into the fifth episode of The Wire.

In some embodiments, the media guidance application may identify alternative content when the number of users in the subset of users is different from the number of users in the synchronized viewing group (e.g., when the number of users viewing the live OTT content that are part of the synchronized viewing group is less than the total number of users in the synchronized viewing group). For example, the media guidance application may identify, from a collection of media assets associated with the OTT provider, a media asset from the collection of media assets matching the intersection of preferences. For example, the media guidance application may determine that each user of the subset of users likes sports content as described above. In response to determining that each user of the subset of users likes sports content, the media guidance application may identify alternative sports content from the OTT provider to transmit to the users during the segment. For example, the media guidance application may identify or generate a highlights reel corresponding to the football game and may generate for display the highlights reel during the segment. By displaying alternative content when not all of the users of the synchronized viewing group are watching the live OTT content, the media guidance application ensures that the progress of all users remains synchronized and provides alternative content so that the subset of users not distracted during the viewing of the segment of the live OTT content.

In some embodiments, the media guidance application may continue to transmit to the plurality of users the segment of the live content in response to determining that the attribute does match the intersection of preferences. For example, the media guidance application may determine that the segment comprises a commercial related to sporting equipment and matches the preferences of the subset of the users (e.g., the preference for sports content). In response to determining that the segment matches the preferences of the subset of users, the media guidance application may continue to transmit the segment to the subset of users. For example, when the media guidance application determines that the commercial relates to sports, content, the media guidance application may continue to transmit the commercial to the subset of users because the commercial relates to content that is of interest to the subset of users. Because the media guidance application continues to transmit live OTT content to the subset of users when the content matches an intersection of preferences for the users, the media guidance application ensures that the subset of users do not miss live OTT content that is of interest to the subset of users.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 depicts an illustrative process for replacing a segment of live OTT content with a portion of non-live OTT content, in accordance with some embodiments of the disclosure;

FIG. 11 depicts an illustrative process for identifying an intersection of user preferences for a subset of users, in accordance with some embodiments of this disclosure.

DETAILED DESCRIPTION

Figure 1:
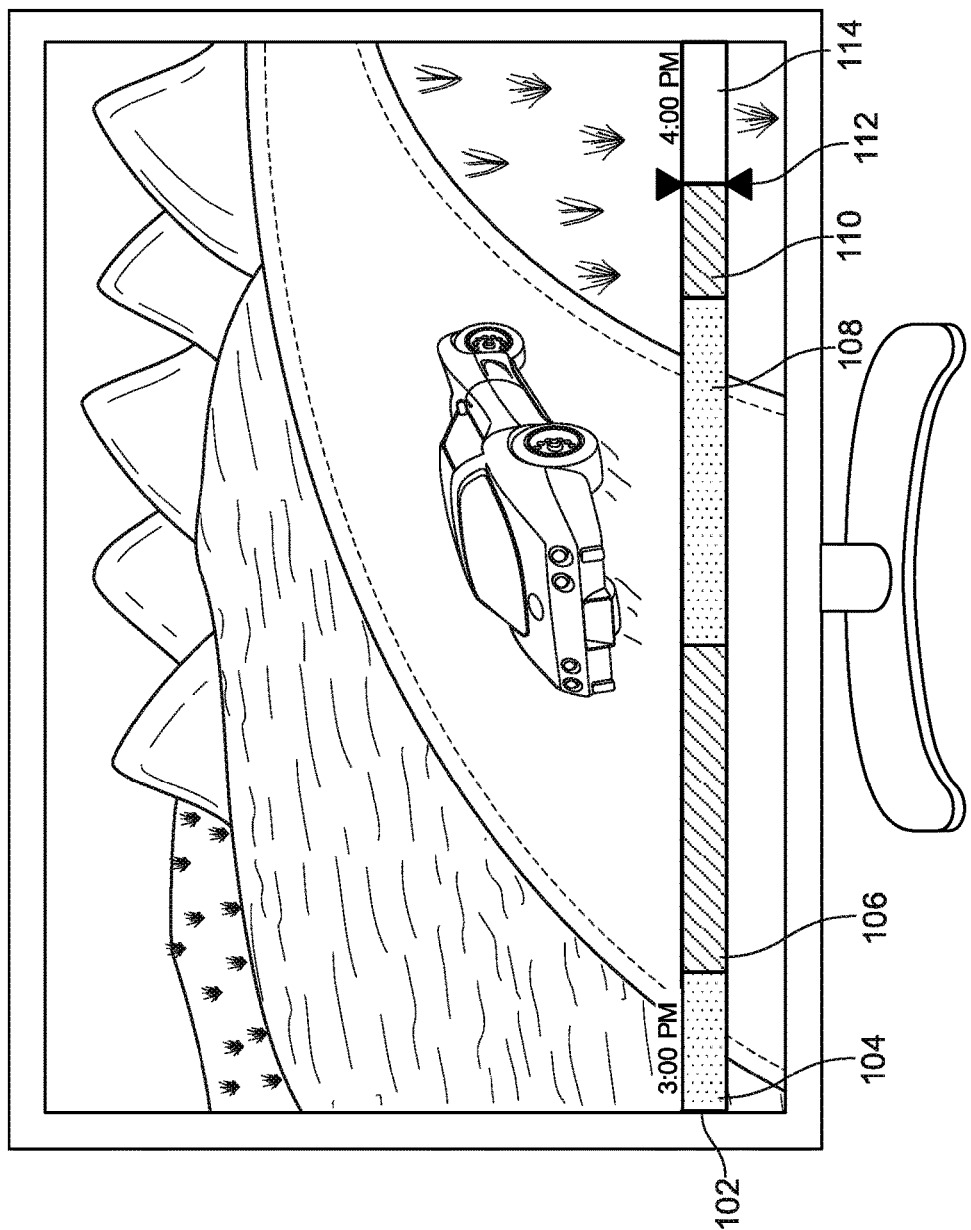
FIG. 1 shows an illustrative media guidance display depicting non-live OTT content replacing live OTT content, in accordance with some embodiments of the disclosure.

Systems and methods are described herein for a media guidance application that replaces a segment of live content from an over-the-top (OTT) provider with a segment of non-live content from the OTT provider for a subset of users that is both disinterested in the segment of live content and also part of a same synchronized viewing group. For example, when a group of users is viewing live content, but is disinterested in a segment of the live content, a media guidance application may provide identical portions of alternative content to the users in the group so that they do not become distracted from the live OTT such that they do not resume viewing the live OTT content after the segment is complete. For example, a plurality of users may be watching live OTT content, such as a stream of the Super Bowl, from an OTT provider, such as Amazon Video. The media guidance application may identify a subset of the plurality of users that watch an episode of the television show "NCIS" every weekend (e.g., a group of users that participate in a synchronized viewing of NCIS). When the media guidance application determines that the users from the subset are disinterested in a segment of the live OTT content, the media guidance application may provide the users with a portion of non-live content from the synchronized viewing to replace the segment. For example, the media guidance application may determine that the group of users strongly dislikes football but likes to watch the commercials during the Super Bowl. Based on this determination, the media guidance application may determine that the subset of users is disinterested in all segments of the Super Bowl that are not commercials. Accordingly, the media guidance application may transmit portions of NCIS to the subset of users when there are not commercials and may transmit to the users the live OTT content during segments that comprise commercials (e.g., because the users are disinterested in the football content of the Super Bowl but are interested in the commercials during the Super Bowl). By transmitting content from the synchronized viewing to the subset of users when the users of the subset of users are disinterested in the live content, the users remain engaged with their television and are less likely to become distracted from the live OTT content during a segment of the live OTT content that the users do not find interesting.

The media guidance application may determine a plurality of users that are viewing content from the OTT provider (e.g., Hulu) and may identify a subset of the plurality of users that have partially progressed through a synchronized viewing of a collection of non-live content from the OTT provider. For example, the media guidance application may determine that of the 103.5 million viewers of the Super Bowl, five users view an episode of NCIS every weekend (e.g., based on retrieving profile data associated with each of the users and determining that those five users set up a synchronized viewing session from the OTT provider every weekend for NCIS).

The media guidance application may determine an intersection of preferences of each user of the subset. For example, the media guidance application may retrieve user profiles for each of the five users in the subset and may compare attributes of the profiles to identify an intersection of preferences. For example, the media guidance application may determine that each of the users of the subset prefers the commercials in the Super Bowl based on monitoring chat histories between the five users and determining, based on the chat histories, that the users have discussed their disinterest in viewing anything but the commercials during the Super Bowl.

The media guidance application may compare the intersection of preferences to segments of the live OTT content to determine when the live OTT content reaches a segment that is uninteresting to the subset. For example, the media guidance application may retrieve metadata associated with each segment of the live OTT content (e.g., from the OTT provider) and may compare an attribute of that segment to the intersection of preferences to determine whether the intersection of preferences matches the attribute of the segment. For example, the media guidance application may determine that the segment is uninteresting to the subset when the media guidance application determines that the segment corresponds to the Super Bowl game and the five users of the subset prefer the commercials (e.g., based on the chat history as discussed above). The media guidance application may, based on the determination, replace the segment of the live OTT content with a portion of non-live OTT content that is preferred by the subset. By replacing the segment of the live OTT content with the portion of the non-live OTT content, the users of the group will continue to receive video content that is interesting to the group of users and will therefore be less inclined to become distracted from their respective media consumption devices.

The media guidance application may, in response to determining that the live content has reached the segment that is uninteresting to the subset, play back the synchronized viewing of the collection from a bookmarked progress point within the collection to each user of the subset while continuing to play back the live content to other users of the plurality of users who are not part of the subset. For example, the media guidance application may determine that the subset of users are not interested in the subset and may playback non-live OTT content in place of the segment of the live OTT content. For example, the media guidance application may playback a portion of NCIS beginning at a next episode in the series that was not yet viewed by the subset of users on a television corresponding to each of the users of the subset. Simultaneously, the media guidance application may continue to display the live OTT content on the respective televisions of the users that are not part of the subset. By replacing the content for the subset of users that are not interested in the segment of live OTT content and simultaneously displaying the live OTT content to the users that are not in the subset, all of the users will remain engaged with the live OTT content and will not become completely distracted from the live OTT due to portions that the user finds uninteresting.

Although the above examples are discussed with respect to a group of five users the number of users in the subset may be any number of users. For example, the media guidance application may identify the group of users as a single user and my transmit to that user content in place of a segment of live OTT content when the media guidance application determines that the user is disinterested in the live OTT content. In another example, the media guidance application may identify the subset of users as one million users and may transmit to those one million users a portion of non-live OTT content during the segment.

Additionally or alternatively, the media guidance application may identify alternative media or activities for the subset of users during the segment. For example, the media guidance application may determine that the users would prefer an alternative activity during the segment of the live OTT content instead of alternative media. Accordingly, the media guidance application may enable a chat group or enable a game that connects each user of the subset of users during the segment.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. FIGS. 1-4 show illustrative display screens that may be used to provide media guidance, and in particular media listings. The display screens shown in FIGS. 1-4 may be implemented on any suitable device or platform. While the displays of FIGS. 1-4 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

As referred to herein, the phrase "media guidance data" "guidance data" or "metadata" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 504, discussed further in relation to FIG. 5 below, executes instructions for a media guidance application stored in memory (i.e., control circuitry 508). Specifically, control circuitry 504 may be instructed by the media guidance application to perform the functions discussed above and below. For example, the media guidance application may provide instructions to control circuitry 504 to generate the media guidance displays discussed in relation to FIG. 1, FIG. 2, FIG. 3, and FIG. 4. In some implementations, any action performed by control circuitry 504 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

As referred to herein, a "portion" and a "segment" of a media asset may refer to any part of a media asset, such as a live video, that is distinguishable from another part of the media asset. For example, a portion may correspond to a frame, set of frames, scene, chapter, segment of time, etc. Likewise, a segment may also correspond to a frame, set of frames, scene, chapter, segment of time, etc. The media guidance application may identify distinct portions or segments based on time marks (e.g., a portion or segment may begin at a first time mark and end at a second time mark) in the play length of a media asset. Alternatively or additionally, the media guidance application may identify portions or segments based on a range of frames (a portion begins at a first frame and ends at a second frame). Alternatively or additionally, the media guidance application may identify portions or segments based on content in the media asset (a portion or segment may begin at the appearance of particular content and end at the appearance of the same or different content). Alternatively or additionally, the media guidance application may identify portions or segments based on metadata associated with the media asset (e.g., a portion may begin at a first metadata tag and end at a second metadata tag). In some embodiments, the portions or segments of the media asset may relate to content in the media asset having a common attribute. For example, the media guidance application may determine at a first time that content in the media asset relates to a news broadcast, and at a second time that the content of the media asset relates to commercials. The media guidance application may correlate the first time and the second time to a time in the media asset. The media guidance application may select as the portion or segment the frames or time period in the media asset corresponding to time between the first time and the second time.

As referred to herein, a "frame" may be any image associated with media. For example, a frame of a movie may be an image captured at a specific point in a media asset. A media asset may comprise a sequence of frames for playback in a specified order. The media guidance application may perform image processing on a frame of media to identify content in the media.

While the discussion of media content has focused on video content, the principles discussed above and below can be applied to other types of media content, such as audio, images, etc.

Live media may comprise any form of media that is transmitted to any user within a threshold amount of time. For example, a video feed of a football game that is transmitted to a user after a one-minute delay may be live media. In another example, a recording of media that is transmitted by a broadcaster to a plurality of users for a first time may also be live media. In some embodiments, any media having a scheduled broadcast time may be live media.

Non-live media may comprise any form of content that is not live media. For example, a recording of a football game may be non-live media. In some embodiments, non-live media may include non-linear content that is accessible to a plurality of users in a non-synchronous manner (e.g., available for streaming from a content library of an OTT provider).

FIG. 1 shows an illustrative media guidance display depicting non-live OTT content replacing segments of live OTT content in accordance with some embodiments of the disclosure. Media guidance display 100 is depicted having time bar 102. Time bar 102 may be associated with a media asset and may indicate a user's progress through media. For example, time bar 102 may be associated with a live football game that began before 3:00 PM and may be expected to terminate at 4:00 PM; a position of a cursor, such as cursor 112, may indicate to a user a current position in time (e.g., a time between 3:00 PM and 4:00 PM) and/or a position within media (e.g., a position within a start time and end time of the media). In some embodiments, a media guidance application may generate for display the time bar 102 on equipment associated with a user in response to a user selection of media from an interactive program guide associated with the media guidance application. For example, the media guidance application may generate for display time bar 102 on first user equipment 208, second user equipment 210, user television equipment 602, user equipment 604, wireless user communications device 606 or any other device associated with a user. In the exemplary embodiment of FIG. 1, time bar 102 is depicted with disparate highlighting to provide an illustration of how a media guidance application may replace a portion of live OTT content with non-live OTT content. In some embodiments, the media guidance application may generate for display highlighting, such as the highlighting depicted on time bar 102, to indicate to a user where the media guidance application replaced various portions of distinct media. For example, the media guidance application may generate a first highlighted region on time bar 102 to indicate that the user viewed a portion of a first media asset during a first time period corresponding to the first highlighted region and may generate for display a second highlighted region on time bar 102 to indicate that the user viewed a second media asset, distinct from the first media asset, during a period of time corresponding to the second highlighted region. For example, as depicted in the exemplary illustration of FIG. 1, the media guidance application may generate for display live highlight regions 104 and 108 corresponding to periods of time where the media guidance application generated for display to the user live OTT content and may generate for display non-live highlight regions 106 and 110 corresponding to periods of time where the media guidance application generated for display to the user non-live OTT content in place of the live OTT content. In some embodiments, the media guidance application may additionally generate for display blank highlight region 114 to indicate that the media guidance application has not yet determined what content to display during the time period corresponding to blank highlight region 114.

In some embodiments, time bar 102 may be generated for display by the media guidance application having cursor 112 aligned with an end of non-live highlight region 110, as depicted in FIG. 1. For example, when the media guidance application is presently generating for display a last frame of a portion of the non-live OTT content corresponding to non-live highlight region 110, cursor 112 may be aligned with an end of the non-live highlight region 110. In another embodiment, the media guidance application may generate for display cursor 112 bisecting any of live highlight regions 104 and 108 and/or non-live highlight regions 106 and 110. For example, the media guidance application may retrieve a portion of non-live OTT content and may generate for display non-live highlight region corresponding based on a portion of non-live OTT content that the non-live OTT content occupies over time bar 102. As the media guidance application progresses through the portion of the non-live OTT content (e.g., by sequentially generating for display video frames corresponding to the portion of the non-live OTT content) the media guidance application may update a position of cursor 112.

In some embodiments, the media guidance application may generate for display time bar 102 on a plurality of user equipment, such as first user equipment 208, second user equipment 210, user television equipment 602, user equipment 604, wireless user communications device 606 or any other device associated with a user. For example, the media guidance application may generate for display time bar 102 when a user of a plurality of users request a media asset via an interactive program guide associated with the media guidance application.

The above description of FIG. 1 is merely illustrative and not limiting. Although time bar 102 depicted in FIG. 1 depicts specific portions of time bar 102 highlighted in a variety of ways, any graphical representation of the progress though a media asset is possible. For example, the media guidance application may generate a pie chart similar to a clock indicating portions of the media asset that were generated for display by the media guidance application at various times corresponding to the portions of the pie chart. Although media guidance display 100 is depicted as a television, media guidance display 114 may be any device capable of conveying media or information to a user, such as a stereo, tablet computer, augmented reality glasses, etc.

Figure 2:
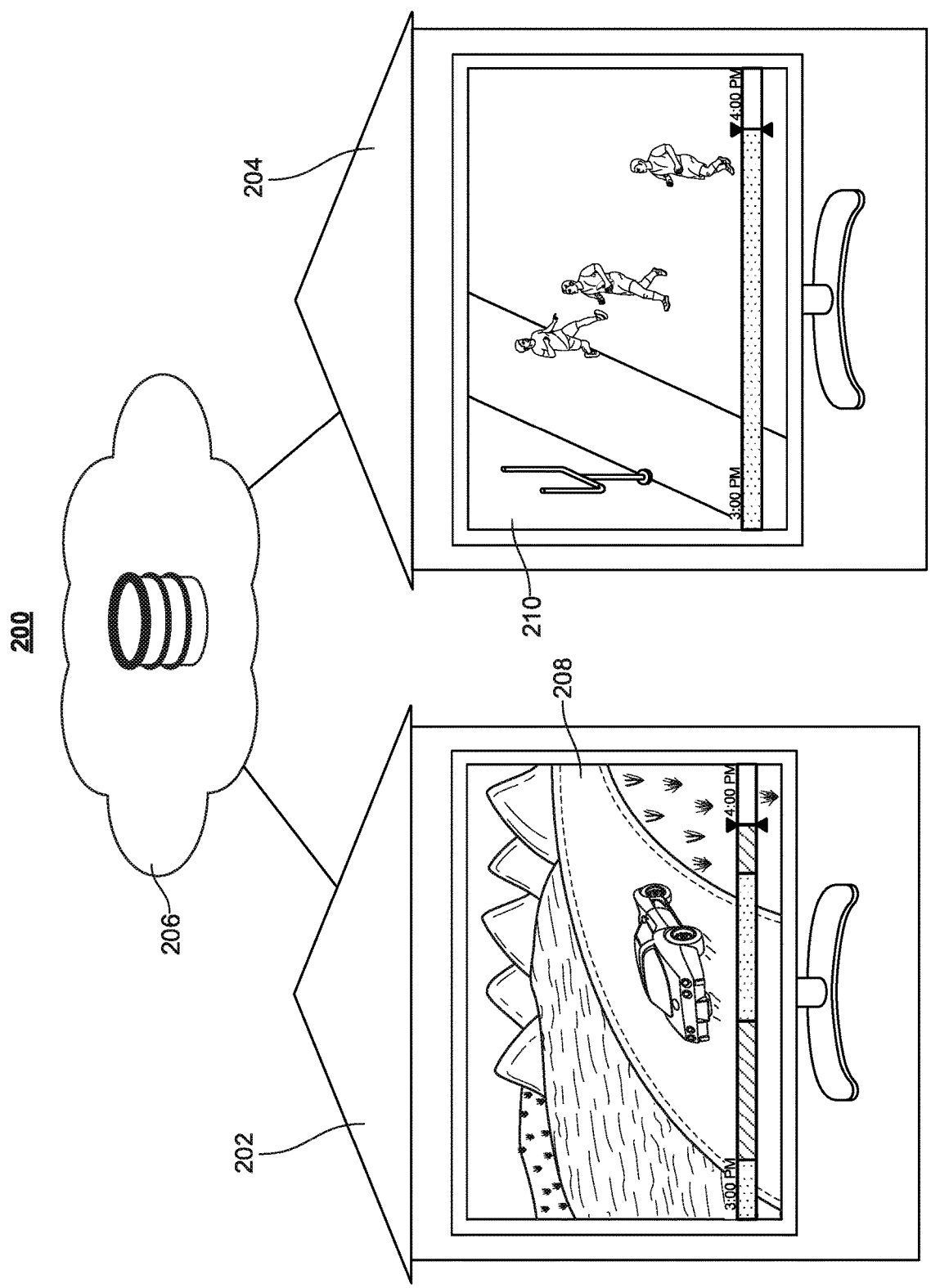
FIG. 2 shows an illustrative media guidance system configuration, in accordance with some embodiments of the disclosure.

FIG. 2 depicts an illustrative media guidance system configuration, in accordance with some embodiments of the disclosure. In FIG. 2 system 200 is depicted having first household 202 and second household 204. First household 202 may be connected to an OTT provider, such as content server 206 via a network connection (e.g., via communications network 614). Although content server 206 is depicted as a single cloud device, content server 206 may include a plurality of computers, each interconnected via a network connection working harmoniously (e.g., to provide content to a plurality of users located in a plurality of locations). In the illustrative embodiment of FIG. 2, first household 202 may comprise first user equipment 208. First user equipment is depicted displaying a display screen similar to that of FIG. 1, while second user equipment is depicted displaying disparate content. For example, the media guidance application may display live OTT content on second user equipment 210 while simultaneously displaying non-live OTT content on first user equipment 208. In some embodiments, the media guidance application may display the non-live content on first user equipment 208 in response to determining that a user associated with first user equipment 208 is disinterested in a segment of live OTT content. The media guidance application may determine that a second user associated with the second user device is interested in the live OTT content and may continue to generate for display the live OTT content on second user equipment 210 without interruption.

In some aspects, the media guidance application may determine a plurality of users are viewing live content from an OTT provider. The media guidance application may identify a plurality of content streams of live OTT content, such as a live football game (e.g., the football game depicted on second user equipment 210) being streamed by the media guidance application via content server 206 over a network connection to a plurality of user equipment (e.g., user equipment running the media guidance application). The media guidance application may determine, based on a unique identifier for each stream of the plurality of content streams, an identity for a user associated with each of the active live OTT content streams. For example, the media guidance application may access a database of user accounts associated with the OTT provider stored at content server 206 where each user account is associated with the unique identifier (e.g., an account number for the user corresponding to the OTT provider). The media guidance application may compare the unique identifier for each stream with a plurality of user profiles (e.g., user profiles stored on content server 206) to determine an identity for each user associated with an active content stream.

The media guidance application may retrieve a respective profile corresponding to each user of the plurality of users from a database. For example, the media guidance application may identify each user associated with an active stream of the live OTT content and may correlate a unique identifier for each user of the plurality of users with a database storing an association between the unique user identifier and the user profile (e.g., based on data identifying the active streams stored on content server 206 and based on the database including the unique identifier for each subscriber of a plurality of subscribers associated with the OTT provider. Based on identifying a user profile associated with each user of the plurality of users, the media guidance application may retrieve respective metadata associated with each respective profile. For example, the media guidance application may retrieve respective preferences of each respective user from each respective profile of the plurality of profiles.

The media guidance application may determine, based on the metadata from each respective profile, a subset of the plurality of users that have partially progressed through a synchronized viewing of a collection of non-live content from the OTT provider (e.g., via content server 206). For example, the media guidance application may identify, based on the metadata, a viewing progress for a second user of the plurality of users for other content in a content library of the OTT provider. For example, the media guidance application may determine that a group of users progressed to a same progress point in the television series The Wire, based on the viewing progress stored in the metadata of the respective user profiles.

In some embodiments, the media guidance application may identify the group of users based on data identifying the group of users stored on content server 206. For example, the media guidance application may transmit from a first user associated with first user equipment (e.g., first user equipment 208) to a second user associated with second user equipment, a request to join a synchronized viewing group (e.g., a group directed to viewing a series of media assets, such as the series The Wire, substantially simultaneously). The media guidance application may establish a synchronized viewing group comprising the first user and the second user in response to receiving an indication from the second user accepting the first user's request to form the group. For example, the media guidance application may receive, at content server 206, the request to form the group from first user equipment 208. Content server 206 may forward the request to a second device associated with a second user. The media guidance application may generate for display an option to the second user to accept the request from the first user or not. In response to receiving an acceptance of the request from the first user, at content server 206, the media guidance application may establish a synchronized viewing group comprising the first user and the second user. For example, the media guidance application may update a profile of the first user and a profile of the second user (e.g., in a profile database stored on content server 206) to indicate the formation of the group between the first and the second user.

In some embodiments, the media guidance application may create a new database object representing the group between the first user and the second user. For example, in response to receiving the request to form the group (or in response to receiving the second user's acceptance to join the group), the media guidance application may create a new database entry in a database storing synchronized viewing group information. For example, the media guidance application may update a pointer in the profile associated with the first user and the second user to point to the database entry associated with the newly created synchronized viewing group entry.

In some embodiments, the media guidance application may update the database entry corresponding to the synchronized viewing group in response to the media guidance application initiating, performing or completing a synchronized viewing session. For example, the media guidance application may identify a request from the first and/or second user to initiate a synchronized viewing session (e.g., via a user interface generated for display by an interactive program guide generated for display by the media guidance application). In response to receiving the request to initiate the synchronized viewing session, the media guidance application may simultaneously transmit (e.g., from content server 206) identical portions of the media asset of the synchronized viewing (e.g., an episode of The Wire) to the first user equipment (e.g., in some instances first user equipment 208 and/or second user equipment 210). The media guidance application may update data in the profile corresponding to the first user and/or second user and/or the database entry for the synchronized viewing group to indicate a timepoint within a media asset of the synchronized viewing. For example, upon completion of the synchronized viewing session (e.g., after the first user and the second user have simultaneously consumed the second episode of The Wire) the media guidance application may update the database entry corresponding to the synchronized viewing group to indicate that the end of the second episode of The Wire is a current viewing progress of the synchronized viewing group.

In some embodiments, the media guidance application may utilize social network data and a viewing progress to determine whether users of the plurality of users are part of a synchronized viewing of a media asset. For example, the media guidance application may identify, based on the metadata from each respective profile, a first group of users of the plurality of users having a same viewing progress in the collection of non-live OTT content. For example, the media guidance application may retrieve, from the metadata, a viewing progress for various media assets in a media content library for the OTT content provider. The media guidance application may compare the viewing progress for the various media assets for the plurality of users to identify a group of users having a same viewing progress for a media asset. For example, the media guidance application may identify, from the plurality of users viewing the live football game, the group of users who have viewed up to episode three in the television series The Wire.

In some embodiments, the media guidance application may determine that the group of users having a same viewing progress is substantially large and may rely on social media connections to identify the synchronized viewing group. For example, the media guidance application may identify, based on the metadata from each respective profile, the subset of users from the group of users based on a determination that the subset of users are linked via a same social network. For example, the media guidance application may identify the subset of users from the group based on a determination that the subset of users are each included in a chat group directed to discussing the television series The Wire, and they also have reached a same progress point in The Wire.

In some embodiments, the media guidance application may retrieve, from the metadata, an indication of the plurality of users included in the synchronized viewing of the collection of non-live content from the OTT provider. For example, the media guidance application may enable the users to establish a group of users for performing a synchronized viewing of the non-live OTT content as discussed above. For example, the media guidance application may allow for a user to invite his or her friends to view an episode of The Wire that is synchronized with each of the friends (e.g., by inviting friends of the user to enter a chat room during a broadcast time associated with the non-live OTT content). The media guidance application may identify the subset of users based on an intersection of the plurality of users simultaneously viewing the live content and the plurality of users included in the synchronized viewing of the collection. For example, the media guidance application may identify as the subset of users those users that are both viewing the live OTT content and those users that were invited to participate in the synchronized viewing of the episode of The Wire (e.g., based on an identification of which users were invited to the chat group).

The media guidance application may determine respective preferences of each respective user of the subset based on the metadata from each respective profile. For example, the media guidance application may retrieve, from a database associated with the profile of the user, user preferences. For example, the media guidance application may prompt a user, when creating a user account, for a user's preference for various categories of content. In response to determining that the user is included in a synchronized viewing session, the media guidance application may retrieve those preferences from the user's profile.

The media guidance application may, for example, automatically identify preferences of a user. For example, the media guidance application may retrieve a viewing profile of the user and may identify the preferences of the user based on the viewing profile. For example, the media guidance application may store, in the profile of the user, an indication of when and/or whether a user interacts with a media asset provided by the OTT provider. When the user interacts with a media asset of the OTT provider, the media guidance application may store a unique identifier for the media asset and/or may store metadata associated with the media asset. For example, the media guidance application may store an identifier, such as a unique number that uniquely identifies the media asset within a library of content provided by the OTT provider. The media guidance application may retrieve the unique identifier and metadata associated with the media asset. For example, the media guidance application may access a database comprising metadata associated with the media asset, such as via communications network 614 from media guidance data source 618. The media guidance application may compare the metadata associated with a first media asset in the user profile with a second media asset in the user profile, and based on the comparison, may identify attributes of the metadata that are similar between the first media asset and the second media asset. In response to determining that an attribute of the metadata associated with the first media asset matches an attribute of the metadata of the second media asset, the media guidance application may determine that the attribute is preferred by the user (e.g., if the user consumes multiple media assets having similar attributes, the media guidance application may determine that it is because of those similar attributes the user watches the media asset).

The media guidance application may retrieve a user profile for each user of the subset and may identify, based on the user profile, a listing of media assets that were previously viewed by the respective user. For example, the media guidance application may determine that the user profile identifies a timeline of what content was consumed by a user. For example, the media guidance application may determine that the user consumes a first OTT content channel while a football game is on, but consumes a second OTT content channel or a non-live media asset while commercials occur in the first channel Accordingly, the media guidance application may determine that the user prefers the football content in a media asset of the first OTT content channel than the commercial content in the first OTT content channel The media guidance application may retrieve metadata associated with each media asset in the user's viewing history, and based on the metadata associated with the viewing history of the user, may determine a set of likes and dislikes associated with the user as described above.

The media guidance application may determine an intersection of the respective preferences of each respective user in the subset. For example, the media guidance application may compare the respective preferences of a first user of the subset of users to those preferences of other users of the subset of users and may identify those preferences associated with the first user that are also associated with each other user of the subset of users. For example, the media guidance application may determine that each user of the subset of users likes football but does not like watching commercials during a football game (e.g., based on a determination from the user preferences that each user of the subset of users tunes away from the football game during the commercials). In response to determining that each user of the subset of users prefers watching the football game and not the commercials, the media guidance application may determine that the intersection of preferences is the football game and not the commercials during the game.

In some embodiments, the media guidance application may retrieve, based on the metadata from each respective profile, respective viewing histories comprising a plurality of media assets viewed by each user of the subset of users. For example, the media guidance application may store, in the user profile for each respective user, an indication when a user requests a media asset, how long the user watches the media asset and/or any user interactions with the media asset (e.g., fast forwarding, rewinding, pausing, etc.). The media guidance application may identify, based on the user profile, media assets that were previously requested by each user of the plurality of users in the subset. For example, the media guidance application may retrieve from the respective user profile of each user an array of media assets that were previously requested by the respective user from the OTT provider.

In some embodiments, the media guidance application may identify, based on the respective viewing histories, respective characteristics corresponding to the plurality of media assets in the respective viewing histories for each user of the subset of users. By comparing the characteristics of the media assets in the viewing histories of the users, the media guidance application may determine the preferences for the user (e.g., based on similar characteristics of media that was previously selected by the users.) For example, the media guidance application may retrieve, from a respective viewing history, an identifier of a media asset that was previously accessed by the user. The media guidance application may transmit the identifier of the media asset (e.g., an identifier for the television show The Wire) to a remote server (e.g., media guidance data source 618) comprising metadata associated with media assets to identify characteristics of the media asset. For example, the media guidance application may receive, in response to the transmitting, metadata corresponding to The Wire such as a genre, title, runtime, etc.

In some embodiments, the media guidance application may identify a characteristic matching at least one of the respective characteristics corresponding to the plurality of media assets in the respective viewing histories for each user of the subset of users. For example, the media guidance application may receive the characteristics of the media assets as described above and may compare a first characteristic for a first media asset in a first viewing history for a first user of the subset with a second characteristic of a second media asset in a second viewing history for a second user. For example, the media guidance application may determine that the television show Game of Thrones is in a first viewing history for a first user and the television show The Sopranos is in a second viewing history for a second user. The media guidance application may retrieve characteristics associated with the media assets in the viewing histories for the two users. For example, the media guidance application may retrieve a genre characteristic for Game of Thrones (e.g., drama genre) and a genre characteristic for The Sopranos (e.g., drama genre). The media guidance application may compare the two characteristics and may determine that both users like the drama genre based on the determination that both of the media assets in the viewing histories of the users are associated with the drama genre.

The media guidance application may determine an attribute of a current segment of the live content to determine whether the subset of users are interested in the current segment of the live content, and if not, provide the subset of users with alternate content. For example, the media guidance application may retrieve metadata associated with the segment of the live content (e.g., the segment corresponding to position indicator 112) and may determine, based on the metadata, an attribute of the segment. For example, the media guidance application may receive data from the OTT provider that indicates whether a current segment is part of the live football game or whether the current segment contains commercials (e.g., the segment represented by non-live highlight region 110). Based on the retrieved data, the media guidance application may determine an attribute of the segment (e.g., a game attribute when the segment corresponds to the football game and a commercial attribute when the segment corresponds to the commercials).

In some embodiments, the media guidance application may identify a segment of the media asset and, based on identifying the segment, identify the attribute of the segment. For example, the media guidance application may identify a transition in the live content to the current segment. For example, the media guidance application may determine based on metadata received with the video data from the OTT provider that there was a transition from a first segment (e.g., a first scene in a movie) to a second segment (e.g., a second scene in a movie). In another example, the media guidance application may identify the transition in the live content by analyzing the video or audio data. The media guidance application may determine that there is a transition in the live content when a threshold number of pixels changes between two sequential video frames. For example, the media guidance application may identify a transition when greater than a threshold number of pixels change from green (e.g., when the live video is contains a sports field) to a color other than green (e.g., when the live video is no longer showing the sports field).

In some embodiments, in response to identifying the transition, the media guidance application may generate a fingerprint of the content in the current segment based on at least one frame of the current segment. For example, the media guidance application may use a suitable algorithm to generate a fingerprint for the media asset based on at least one video and/or audio frame from the identified segment of the live OTT content. The media guidance application may compare the generated fingerprint to a database of known fingerprint-attribute pairs generated based on the same or similar algorithm to identify an attribute associated with the segment of the live OTT content. For example, the media guidance application may identify a transition between the football game to a commercial. The media guidance application may identify the portion of the live OTT content comprising the commercial as the segment. The media guidance application may retrieve frames of the commercial and may generate a fingerprint for the commercial and may compare the fingerprint to a database of known fingerprints. The media guidance application may determine, based on the comparison, that the fingerprint corresponds to a soap commercial. The media guidance application may determine, based on the identified known content fingerprint, the attribute of the content segment. For example, the media guidance application may determine that the attributes are "commercial" and "soap" based on the determination that the fingerprint generated from the live OTT content matches a known fingerprint for a soap commercial.

In an example, the media guidance application may run an image-processing algorithm, such as an object detection algorithm on a frame of the live OTT content, to determine the attribute of the segment. For example, the media guidance application may perform edge detection within a particular frame and, based on the results, detect contours of various objects within the frame. For example, the media guidance application may perform a search-based or a zero-crossing-based edge detection method on a frame of the media. The media guidance application may approximate a first derivative of pixel data corresponding to the frame to derive a gradient for the image (e.g., by convolving the image with a kernel, such as a Sobel operator). Based on the gradient, the media guidance application may identify local minima or maxima in the gradient. The media guidance application may suppress all pixels not identified as a local minima or maxima and may apply thresholding or hysteresis to filter the output.

When edge detection is complete, the media guidance application may extract an object discovered during edge detection. For example, the media guidance application may create a fingerprint for objects in the frame based on the edge detection algorithm as described above. The media guidance application may compare the fingerprint for the frame to an object database that stores object fingerprints that are known and have been categorized into known objects. The object database (e.g., media guidance data source 618) may also store descriptions of the objects contained within the object database. When the media guidance application detects a particular object in a frame, the media guidance application may retrieve keywords describing the object from the object database and may utilize a keyword as the attribute.

In some embodiments, the media guidance application may identify the attribute of the segment by performing a sound processing algorithm on audio corresponding to the segment. For example, the media guidance application may retrieve audio corresponding to the segment. The media guidance application may compute a fingerprint for the audio and may compare the fingerprint to a database listing fingerprints of audio segments. In another example, the media guidance application may convert audio to text (e.g., via a speech-to-text algorithm). The media guidance application may compare text of the audio and may identify text from the conversion as the attribute. Additionally, or alternatively, the media guidance application may utilize the text of the conversion to perform a search on a database of attributes (e.g., to identify an attribute corresponding to the text).

In response to determining that the attribute does not match the intersection of preferences, the media guidance application may transmit to the subset of users synchronized replacement content during the segment while continuing to transmit to the other users, of the plurality of users, the live OTT content. By transmitting replacement content to the subset of users, the subset of users will likely remain engaged with the content of the OTT provider instead of becoming distracted when the subset of users are not interested in the live OTT content. For example, when the media guidance application determines that a user does not prefer football content during a live broadcast of a football game, the media guidance application may transmit to the user alternative content during the football game and may transmit to the user the commercials or commentary from the football game.

The media guidance application may retrieve, from a database, a bookmarked progress point that corresponds to the synchronized viewing. By retrieving the bookmarked progress point, the media guidance application may begin transmitting replacement content to the subset of users beginning at a point of the synchronized viewing that the subset of viewers last consumed. For example, the media guidance application may determine that the subset of users participates in a synchronized viewing of The Wire as described above (e.g., based on the viewing history in each user's profile). Based on the determination that the users participate in the synchronized viewing, the media guidance application may retrieve a bookmark corresponding to a progress point reached by each of the users in the synchronized viewing. For example, the media guidance application may determine that each user of the subset has watched up through the fourth episode of The Wire. Accordingly, the media guidance application may identify the bookmark as the beginning of the fifth episode (e.g., because all of the users have already viewed each of the episodes preceding the fifth episode).

The media guidance application may transmit to each user of the subset an identical portion of the non-live OTT content in place of the segment of the live content, beginning at the bookmarked progress point. For example, the media guidance application may begin transmitting a beginning portion of the fifth episode of The Wire to each user in the subset (e.g., a user associated with first user equipment 208) based on the determination that each user of the subset has watched up through the fourth episode. For example, the media guidance application may transmit to first user equipment 208 the segment of the live content from content server 206 and/or media content source 616 via communications network 614.

In some embodiments, the media guidance application may estimate the duration of the segment and may transmit the portion of the non-live OTT content to the subset of users for the duration of the segment. For example, the media guidance application may determine, based on comparing a fingerprint of the segment to the database, that the segment is two minutes long. In response to estimating the duration of the segment, the media guidance application may retrieve a portion of the non-live OTT content equal to the duration of the segment and may transmit that portion of the non-live OTT content to the segment of users. For example, the media guidance application may determine that the soap commercial is two minutes long and may accordingly transmit a two-minute portion of the fifth episode of The Wire to each of the users in the subset.

In some embodiments, the media guidance application may simultaneously monitor the live OTT content while transmitting the non-live OTT content to the users (e.g., a user at first user equipment 208 and second user equipment 210) to determine an end time for the segment of the live OTT content. For example, the media guidance application may determine when a beginning of the soap commercial occurs and may begin transmitting the fifth episode of The Wire to the subset of users. While the media guidance application is transmitting the episode of the wire to the subset of users, the media guidance application may monitor the live OTT content, such as the video and/or audio frames of the live OTT content, and/or metadata associated with the live OTT content, to determine an ending for the segment. For example, the media guidance application may monitor the frames of the live OTT content and may determine, based on a fingerprint generated from the live OTT content, that the live OTT content is no longer depicting the commercial and has returned to the football game. Accordingly, the media guidance application may identify the transition as the end of the segment. In another example, the media guidance application may determine an end time for the segment based on the metadata associated with the live OTT content. For example, the media guidance application may monitor the metadata associated with the live video and may identify the end of the segment when the metadata indicates that the segment no longer corresponds to the commercial break.

In some embodiments, the media guidance application may record a portion of the live content to accommodate a duration of the replacement content. For example, the media guidance application may select replacement content having a duration of 10 minutes (e.g., based on determining that a scene in the replacement content is 10 minutes long and based on a determination that the media guidance application should not spread the scene across multiple breaks). For example, the media guidance application may determine that the scene should not be broken up into smaller segments (e.g., based on retrieving a threshold minimum duration for replacement content). Accordingly, the media guidance application may transmit to the subset of users, the replacement content for 10 minutes. The media guidance application may begin recording a portion of the live OTT content that is of interest to the subset of users that occurs while the replacement content is being transmitted by the media guidance application to the subset of users. For example, two minutes into the replacement content, the media guidance application may determine that the live OTT content would be of interest to the subset of users. In response to the determination, the media guidance application may record the portion of the live OTT (e.g., locally on a user device or multiple user devices and/or in a server located remote to the users). The media guidance application may begin playback of the recorded live OTT content at an ending of the replacement content. For example, the media guidance application may begin transmitting the recorded portion of the live OTT content to the subset of users when the replacement content completes. The media guidance application may continue to record the live OTT content until reaching a lull in the media where the media guidance application catches up to the live OTT content.

In some embodiments, when the media guidance application determines that the segment is complete, the media guidance application may resume transmitting the live OTT content to the users so that they can resume viewing the live OTT content when it comprises content that is of interest to the subset of users. For example, the media guidance application may determine that after the two minute soap commercial, the live OTT content returns to the football game. In response to determining that the live OTT content returns to the football game, the media guidance application may begin transmitting the live OTT content to the subset of users so that the subset of users can resume viewing the football game. For example, the media guidance application may transmit to first user equipment 208 the live OTT content and may generate a new live highlight region, such as live highlight region 104 and 108 on timeline 102.

In some embodiments, the media guidance application may update the bookmarked progress point upon resuming transmitting the live OTT content to the subset of users. For example, the media guidance application may determine that each user of the synchronized viewing has viewed the first two minutes of the fifth episode of The Wire (e.g., because the media guidance application transmitted the first two minutes to the subset of users and each user of the synchronized viewing is included in the subset of users.) For example, the media guidance application may update a location in memory associated with a bookmark for the synchronized viewing group to indicate that the current playback progress is two minutes into the fifth episode of The Wire. For example, the media guidance application may access a memory located remotely to the media guidance application (e.g., on media guidance data source 618) or local to the media guidance application such as storage 508, and may update the bookmark. In some embodiments the bookmark may be associated with the synchronized viewing group. For example, the media guidance application may update the social media group to indicate the current playback progress. In another embodiment, the media guidance application may update the current playback progress for each individual user in the synchronized viewing group. For example, the media guidance application may access a profile associated with each user of the subset of users and may update a playback progress for the fifth episode to indicate that two minutes were viewed by the user.

The media guidance application may continue to transmit, to the other users of the plurality of users that are not part of the subset, the segment of the live content (e.g., a user corresponding to the second user equipment 210). For example, the media guidance application may continue to transmit the live OTT content (e.g., the commercials) to the other users of the plurality of users that are not part of the subset (e.g., a user corresponding to second user equipment 210 that receives the football content) while the users that are part of the subset are transmitted replacement content (e.g., a user corresponding to first user equipment 208 that receives the first two minutes of the fifth episode of The Wire).

In some embodiments, the media guidance application may determine whether a number of users in the subset of users matches a number of users in the plurality of users included in the synchronized viewing of the collection. For example, the media guidance application may determine the number of users included in the synchronized viewing (e.g., by determining the number of users invited to the synchronized viewing of the episode of The Wire on the social network group) and may compare that number to the number of the subset of users. When the media guidance application determines that the number of users in the subset is less than the number of users in the plurality of users included in the synchronized viewing, the media guidance application may identify a user that is not included in the subset and may allow for that user to have a private viewing session to catch up to the synchronized viewing session of the other users in the subset. For example, if the media guidance application determines that a user from the synchronized viewing is not currently viewing the live OTT content (e.g., the user is not viewing the live football game), the media guidance application may present an option to the user to catch up to any content that is viewed by the subset during the live OTT content (e.g., the portions of non-live OTT content transmitted to the subset during the segment of the live OTT content, such as the first two minutes of the fifth episode of The Wire).

In some embodiments, the media guidance application may update the bookmark in response to determining that the identified user viewed the identical portion of the non-live OTT content outside of the synchronized viewing. For example, the media guidance application may transmit to the identified user an option for the user to catch up on the identical portion that was viewed by the users in the subset during the synchronized viewing. The media guidance application may determine when the identified user views the identical portion (e.g., by identifying a user selection of the option) and may update the bookmark once the viewer has viewed the identical portion to indicate that the bookmark begins at two minutes into the fifth episode of The Wire.

In some embodiments, the media guidance application may identify alternative content when the number of users in the subset of users is different from the number of users in the synchronized viewing group (e.g., when the number of users viewing the live OTT content that are part of the synchronized viewing group is less than the total number of users in the synchronized viewing group). For example, the media guidance application may identify, from a collection of media assets associated with the OTT provider, a media asset from the collection of media assets matching the intersection of preferences. For example, the media guidance application may determine that each user of the subset of users likes sports content as described above. In response to determining that each user of the subset of users likes sports content, the media guidance application may identify alternative sports content from the OTT provider to transmit to the users during the segment. For example, the media guidance application may identify or generate a highlights reel corresponding to the football game and may generate for display the highlights reel during the segment. By displaying alternative content when not all of the users of the synchronized viewing group are watching the live OTT content, the media guidance application ensures that the progress of all users remains synchronized and provides alternative content so that the subset of users is not distracted during the viewing of the segment of the live OTT content.

In some embodiments, the media guidance application may continue to transmit to the plurality of users the segment of the live content in response to determining that the attribute does match the intersection of preferences. For example, the media guidance application may determine that the segment comprises a commercial related to sporting equipment and matches the preferences of the subset of the users (e.g., the preference for sports content). In response to determining that the segment matches the preferences of the subset of users, the media guidance application may continue to transmit the segment to the subset of users. For example, when the media guidance application determines that the commercial relates to sports content, the media guidance application may continue to transmit the commercial to the subset of users because the commercial relates to content that is of interest to the subset of users. Because the media guidance application continues to transmit live OTT content to the subset of users when the content matches an intersection of preferences for the users, the media guidance application ensures that the subset of users do not miss live OTT content that is of interest to the subset of users.

The above description of FIG. 2 is merely illustrative and not limiting. Although time bar 102 depicted in FIG. 2 depicts two households comprising two user devices, any number of households and any number of user device configurations are possible. For example, the media guidance application may determine that a first user within a household prefers the commercial content and a second user within the household prefers the football content in a live OTT football game, as described above. The media guidance application may therefore transmit to a first wearable device of the first user a portion of a non-live OTT media asset during the football segment of the live OTT content; whereas the media guidance application may transmit to a second wearable device of a second user a second portion of a second non-live media asset during the commercial segment of the live OTT content.

Figure 3:
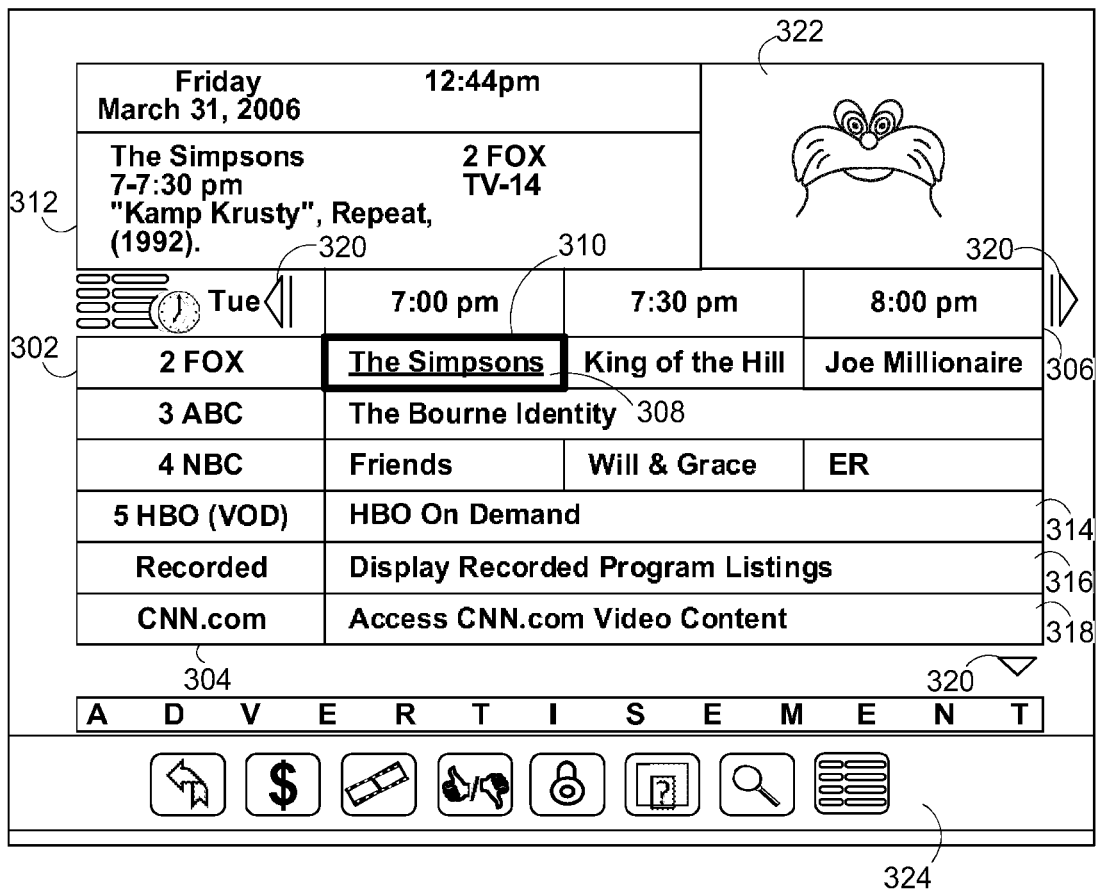
FIG. 3 shows an illustrative example of a media guidance display that may be presented in accordance with some embodiments of the disclosure.

FIG. 3 shows illustrative grid program listings display 300 arranged by time and channel that also enables access to different types of media content in a single display. Display 300 may include grid 302 with: (1) a column of channel/media type identifiers 304, where each channel/media type identifier (which is a cell in the column) identifies a different channel or media type available; and (2) a row of time identifiers 306, where each time identifier (which is a cell in the row) identifies a time block of programming Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 302 may provide listings for non-linear programming including on-demand listing 314, recorded media listing 316, and Internet content listing 318. A display combining listings for content from different types of media sources is sometimes referred to as a "mixed-media" display. The various permutations of the types of listings that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In other embodiments, listings for these media types may be included directly in grid 302. Additional listings may be displayed in response to the user selecting one of the navigational icons 320. (Pressing an arrow key on a user input device may affect the display in a similar manner as selecting navigational icons 320.)

Display 300 may also include video region 322 and options region 324. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 3003 and Yuen et al. U.S. Pat. No. 6,239,794, issued May 29, 3001, which are hereby incorporated by reference herein in their entireties. PIG displays may be included in other media guidance application display screens of the present invention.

Options region 324 may allow the user to access different types of media content, media guidance application displays, and/or media guidance application features. Options region 324 may be part of display 300 (and other display screens of the present invention), or may be invoked by a user by selecting an on-screen option or pressing a dedicated or assignable button on a user input device. The selectable options within options region 324 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences.

Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 6. Additional personalized media guidance application features are described in greater detail in Ellis et al., U.S. patent application Ser. No. 11/179,410, filed Jul. 11, 3005, Boyer et al., U.S. patent application Ser. No. 09/437,304, filed Nov. 9, 1999, and Ellis et al., U.S. patent application Ser. No. 10/105,128, filed Feb. 31, 3002, which are hereby incorporated by reference herein in their entireties.

Figure 4:
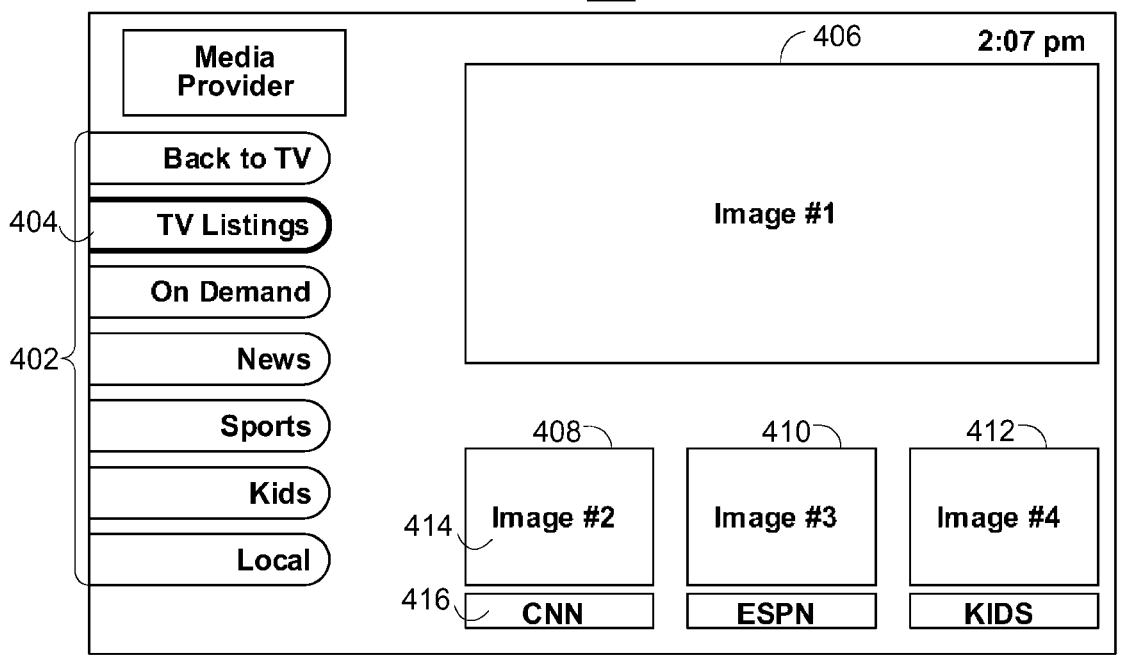
FIG. 4 shows another illustrative example of a media guidance display that may be presented in accordance with some embodiments of the disclosure.

Another display arrangement for providing media guidance is shown in FIG. 4. Video mosaic display 400 includes selectable options 402 for media content information organized based on media type, genre, and/or other organization criteria. In display 400, television listings option 404 is selected, thus providing listings 406, 408, 410, and 412 as broadcast program listings. Unlike the listings from FIG. 3, the listings in display 400 are not limited to simple text (e.g., the program title) and icons to describe media. Rather, in display 400 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 408 may include more than one portion, including media portion 414 and text portion 416. Media portion 414 and/or text portion 416 may be selectable to view video in full-screen or to view program listings related to the video displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 3005, which is hereby incorporated by reference herein in its entirety.

Users may access media content and the media guidance application (and its display screens described above and below) from one or more of their user equipment devices. FIG. 5 shows a generalized embodiment of illustrative user equipment device 400. More specific implementations of user equipment devices are discussed below in connection with FIG. 6. User equipment device 500 may receive media content and data via input/output (hereinafter "I/O") path 502. I/O path 502 may provide media content (e.g., broadcast programming, on-demand programming, Internet content, and other video or audio) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry 506 such as processing circuitry based on one or more microprocessors, microcontrollers, digital signal processors, programmable logic devices, etc. In some embodiments, control circuitry 504 executes instructions for a media guidance application stored in memory (i.e., storage 508). In client-server based embodiments, control circuitry 504 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 508 that is part of control circuitry 504. Storage 508 may include one or more of the above types of storage devices. For example, user equipment device 500 may include a hard drive for a DVR (sometimes called a personal video recorder, or PVR) and a DVD recorder as a secondary storage device. Storage 508 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting media into the preferred output format of the user equipment 500. Circuitry 504 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may control the control circuitry 504 using user input interface 410. User input interface 510 may be any suitable user interface, such as a remote control, mouse, trackball, keypad, keyboard, touch screen, touch pad, stylus input, joystick, voice recognition interface, or other user input interfaces. Display 512 may be provided as a stand-alone device or integrated with other elements of user equipment device 500. Display 512 may be one or more of a monitor, a television, a liquid crystal display (LCD) for a mobile device, or any other suitable equipment for displaying visual images. In some embodiments, display 512 may be HDTV-capable. Speakers 514 may be provided as integrated with other elements of user equipment device 500 or may be stand-alone units. The audio component of videos and other media content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly implemented on user equipment device 500. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server.

In yet other embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be a EBIF widget. In other embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program. In some embodiments, the guidance application may be generated by a remote server and transmitted to user equipment as a MPEG stream.

Figure 5:
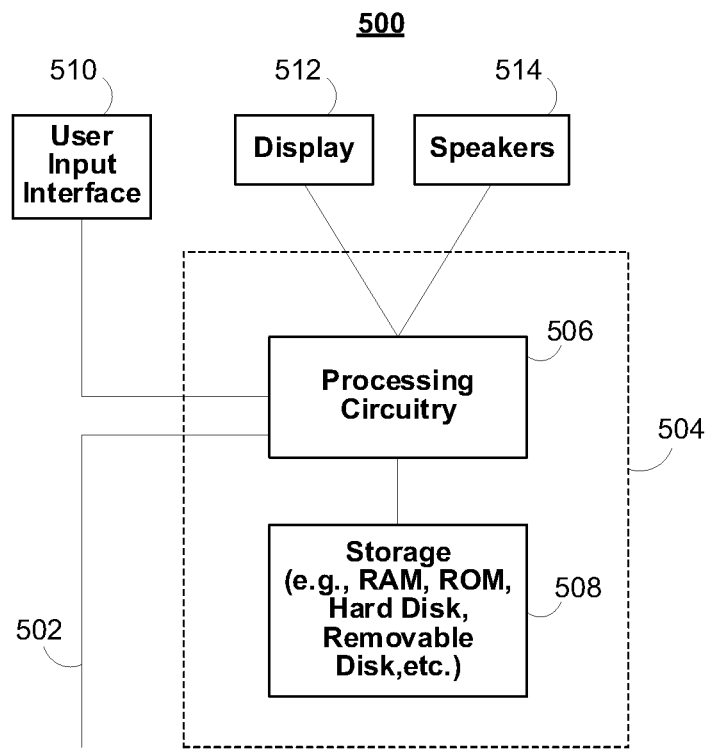
FIG. 5 is a block diagram of an illustrative user equipment device in accordance with some embodiments of the disclosure.
Figure 6:
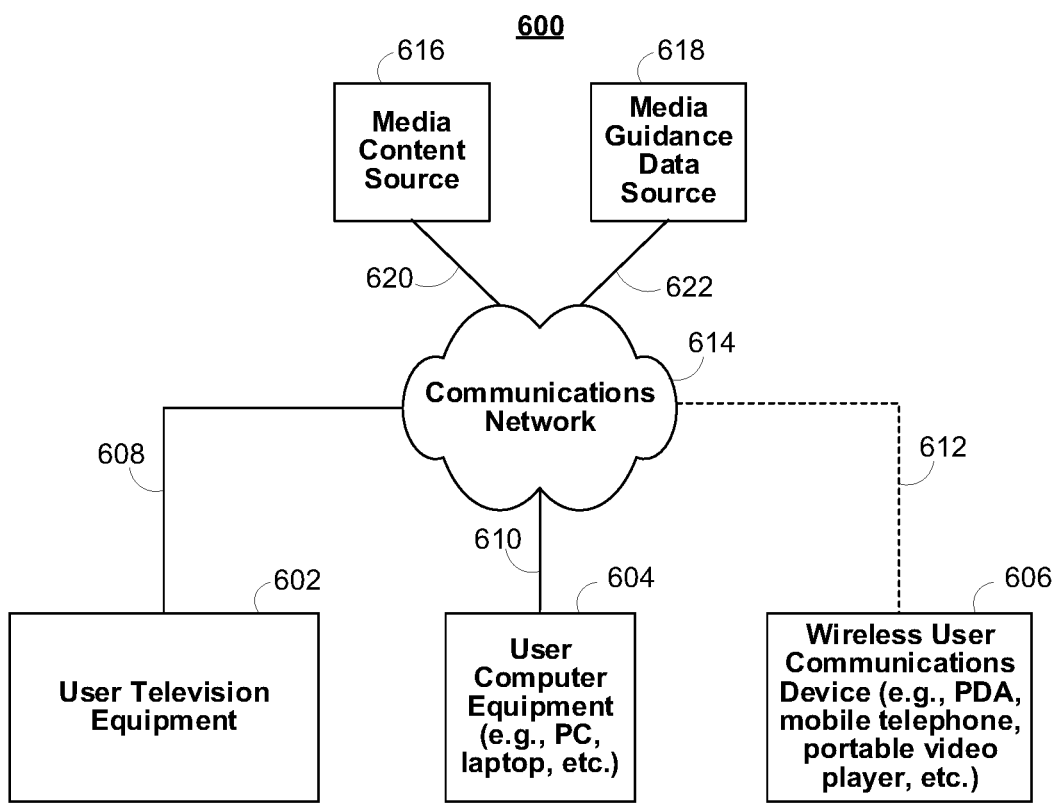
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 602 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 604 may include a PC, a laptop, a tablet, a WebTV box, a personal computer television (PC/TV), a PC media server, a PC media center, or other user computer equipment. WEBTV is a trademark owned by Microsoft Corp. Wireless user communications device 606 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 602, user computer equipment 604, and wireless user communications device 606 may utilize at least some of the system features described above in connection with FIG. 5 and, as a result, include flexibility with respect to the type of media content available on the device. For example, user television equipment 602 may be Internet-enabled allowing for access to Internet content, while user computer equipment 604 may include a tuner allowing for access to television programming The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 500, there is typically more than one of each type of user equipment device but only one of each is shown in FIG. 6 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes media content source 616 and media guidance data source 618 coupled to communications network 614 via communication paths 620 and 622, respectively. Paths 620 and 622 may include any of the communication paths described above in connection with paths 608, 610, and 612. Communications with the media content source 616 and media guidance data source 618 may be exchanged over one or more communications paths, but are shown as a single path in FIG. 6 to avoid overcomplicating the drawing. In addition, there may be more than one of each of media content source 616 and media guidance data source 618, but only one of each is shown in FIG. 6 to avoid overcomplicating the drawing. (The different types of each of these sources are discussed below.) If desired, media content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 512.

Media content source 616 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 616 may be the originator of media content (e.g., a television broadcaster, a Webcast provider, etc.) or may not be the originator of media content (e.g., an on-demand media content provider, an Internet provider of video content of broadcast programs for downloading, etc.). Media content source 616 may include cable sources, satellite providers, on-demand providers, Internet providers, or other providers of media content. Media content source 616 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 618 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 618 may be provided to users' equipment using a client-server approach. For example, a guidance application client residing on the user's equipment may initiate sessions with source 618 to obtain guidance data when needed. Media guidance data source 618 may provide user equipment devices 602, 604, and 606 the media guidance application itself or software updates for the media guidance application.

Media guidance applications may be, for example, stand-alone applications implemented on user equipment devices. In other embodiments, media guidance applications may be client-server applications where only the client resides on the user equipment device.

For example, media guidance applications may be implemented partially as a client application on control circuitry 604 of user equipment device 600 and partially on a remote server as a server application (e.g., media guidance data source 618). The guidance application displays may be generated by the media guidance data source 618 and transmitted to the user equipment devices. The media guidance data source 618 may also transmit data for storage on the user equipment, which then generates the guidance application displays based on instructions processed by control circuitry.

Media guidance system 600 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 6.

In one approach, user equipment devices may communicate with each other within a home network. User equipment devices can communicate with each other directly via short-range point-to-point communication schemes describe above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 3005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 3004, which is hereby incorporated by reference herein in its entirety.

In a third approach, users of user equipment devices inside and outside a home can use their media guidance application to communicate directly with media content source 616 to access media content. Specifically, within a home, users of user television equipment 604 and user computer equipment 606 may access the media guidance application to navigate among and locate desirable media content. Users may also access the media guidance application outside of the home using wireless user communications devices 606 to navigate among and locate desirable media content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

FIG. 7 is a flowchart of illustrative steps for replacing a segment of live OTT content with a portion of non-live OTT content in accordance with some embodiments of the disclosure. For example, a media guidance application implementing process 700 may be executed by control circuitry 504. In some embodiments, instructions for executing process 700 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 700, or any step thereof, could be performed on, or provided by, any of the devices shown in FIGS. 1, 2, 5, and 6.

Process 700 begins at 702, where, for example, control circuitry 504 determines a plurality of users that are viewing live content from an over-the-top (OTT) provider. For example, control circuitry 504 may identify a plurality of users (e.g., a first user associated with first user equipment 208 and a second user associated with second user equipment 210) connected to the OTT provider (e.g., media content server 206 and/or media content source 616) having an active streaming connecting to the OTT provider (e.g., wireless user communications device 606, user computer equipment 614, user television equipment 602, first user equipment 208, or second user equipment 210, connected to media content server 206 and/or media content source 616 via communications network 614). For example, control circuitry 504 may transmit a request (e.g., via communications network 614) to content provider 206 and may retrieve, from content provider 206 or media content source 616, an array of users accessing content from the OTT provider. Control circuitry 504 may determine, based on the array of users, users in the array that are accessing content from the content provider (e.g., content provider 206 or media content source 616).

At 704, control circuitry 504 determines a subset of the plurality of users that have partially progressed through a synchronized viewing of a collection of non-live content from the OTT provider. For example, control circuitry 504 may transmit over communications network 614 a request to media guidance data source 618 requesting data identifying users in a synchronized viewing group of users as described above. Control circuitry 504 may receive, over communications network 614, an array identifying the users in the viewing group and may determine, based on the array of users, the synchronized viewing group. For example, control circuitry 504 may analyze a data structure associated with the synchronized viewing group, such as an array of users associated with the group, and may identify, based on the array, the users that are included in the synchronized viewing group.

At 706, control circuitry 504 determines an intersection of preferences of each user of the subset of users. For example, control circuitry 504 may identify a plurality of users (e.g., a unique identifier for each user) of the subsets of users as described above. Control circuitry 504 may, for example, request the user profile from local storage, such as storage 508, or remote storage, such as media guidance data source 618, by transmitting (e.g., via communications network 614) a query to a user profile database comprising a unique profile identifier for each user of the subset of users. Control circuitry 504 may retrieve, from storage 508 or media guidance data source 618, a profile for each user of the synchronized viewing. For example, control circuitry 504 may retrieve a profile for each user listed in the array of users associated with the synchronized viewing. Control circuitry 504 may compare the profiles of each of the users to identify an intersection of preferences for the user. For example, control circuitry 504 may determine that greater than a threshold number or percentage of users of the synchronized viewing are associated with a specific user profile characteristic (e.g., based on comparing the data of the users profiles and determining that an attribute of the user profile, such as a preference for sports, is present in at least a threshold percentage of the user profiles).

At 708, control circuitry 504 determines, based on the intersection of preferences, that the live content has reached a segment that is uninteresting to the subset. For example, control circuitry 504 determines a characteristic of the segment (e.g., whether the segment corresponds to sports content or a commercial) based on retrieving metadata associated with the segment (e.g., from media guidance data source 618 via communications network 614) and may compare the characteristic to the intersection of preferences to determine whether the segment of the media asset is uninteresting to the subset (e.g., in response to determining that the intersection of preferences does not match the attribute). In another example, control circuitry 504 may determine the characteristic of the segment based on profiling segment. For example, control circuitry 504 may analyze a frame of the segment (e.g., a frame received by control circuitry 504 from media content source 616 via communications network 614).

At 710, control circuitry 504 plays back the synchronized viewing of the collection from a bookmarked progress point within the collection to each user of the subset while continuing to playback the live content to other users of the plurality of users who are not part of the subset in response to determining that the live content has reached the segment that is uninteresting to the subset. For example, control circuitry 504 may retrieve, from media content source 616 via communications network 614 and/or from content server 206, a portion of the non-live OTT content, such as on-demand media available from the OTT content provider. Control circuitry 504 may transmit the portion of the non-live OTT content to a first user that is part of the synchronized viewing group (e.g., a user associated with first user equipment 208) over communications network 614, while control circuitry 504 continues to transmit (e.g., from media content source 616 or content server 206 via communications network 614) the live OTT content to users of the plurality of users that are not part of the subset (e.g., a second user associated with second user equipment 210 that is interested in the segment of the live OTT content).

It is contemplated that the steps or descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 1, 2, 5, and 6 could be used to implement one or more portions of the process.

Figure 8:
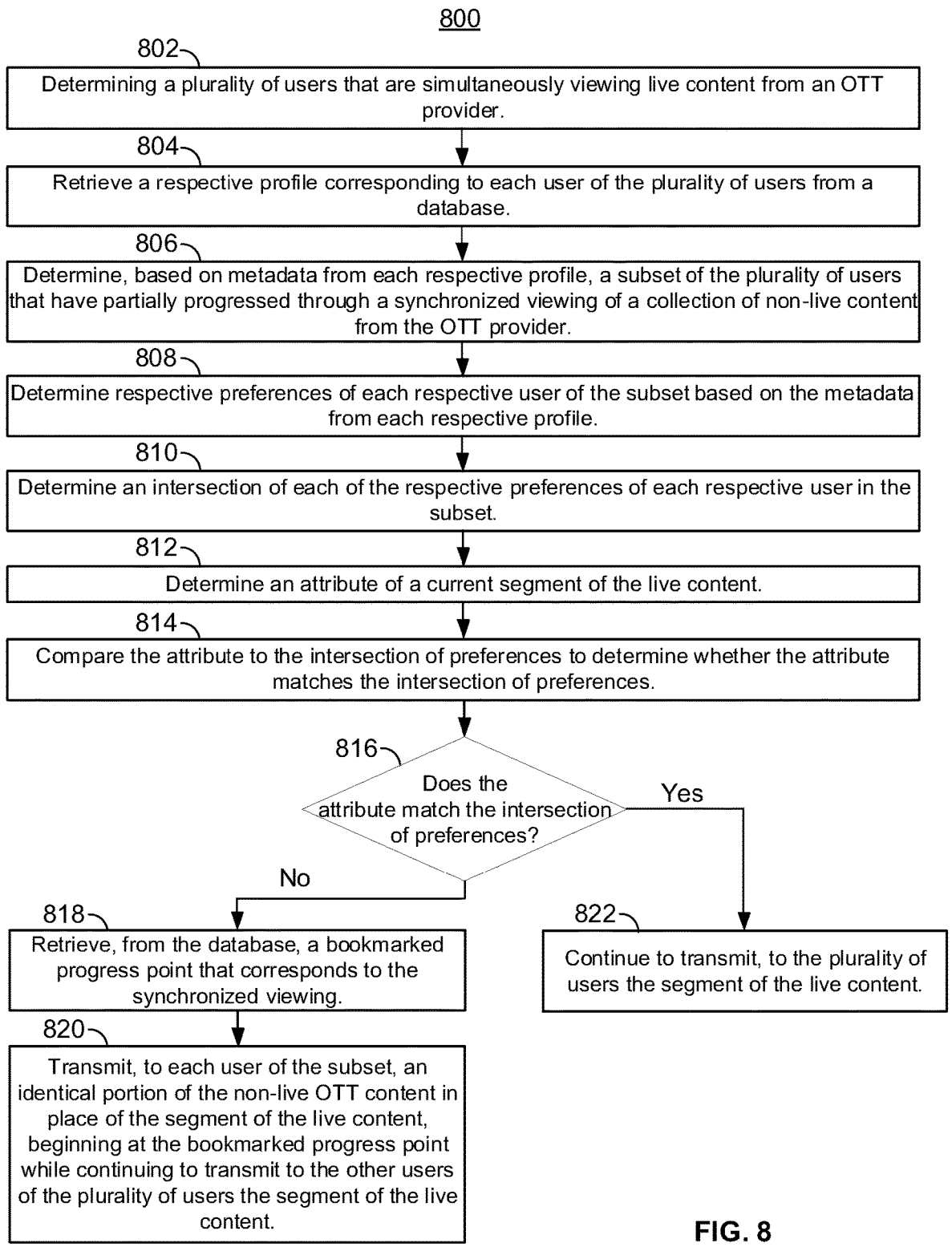
FIG. 8 depicts another an illustrative process for replacing a segment of live OTT content with a portion of non-live OTT content, in accordance with some embodiments of this disclosure.

FIG. 8 is a flowchart of illustrative steps for replacing a segment of live OTT content with a portion of non-live OTT content in accordance with some embodiments of the disclosure. For example, a media guidance application implementing process 800 may be executed by control circuitry 504. In some embodiments, instructions for executing process 800 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 1, 2, 5, and 6.

Process 800 begins at 802, where control circuitry 504 determines a plurality of users that are viewing live content from an over-the-top (OTT) provider. For example, as described above, control circuitry 504 may retrieve from a memory of the content provider (e.g., media guidance data source 618 at content server 206) a list of active streaming sessions associated with the OTT provider. For example, control circuitry 504 may identify a plurality of user devices, such as first user equipment 208, second user equipment 210, user television equipment 602, user computer equipment 604, and/or wireless user communications device 606 accessing content server 206 via communications network 614 and displaying the accessed content on display 512. Control circuitry 504 may determine, based on the active streaming sessions, a plurality of users having streaming sessions activated that are associated with a live OTT content stream. For example, control circuitry 504 may identify a plurality of users that are accessing content of the OTT provider along with an identifier of what content those users are accessing. Control circuitry 504 may compare an identifier of the live OTT content stream to the received identifiers to determine whether a user is accessing the live content stream (e.g., when an identifier of a stream accessed by a user matches the unique identifier, control circuitry 504 may determine that the user is accessing the live OTT content stream).

At 804, control circuitry 504 retrieves a respective profile corresponding to each user of the plurality of users from a database. For example, control circuitry 504 may access a database associated with user profiles stored locally to the control circuitry 504 of a user device (e.g., via storage 508) or located remotely to the control circuitry 504 of a user device (e.g., via media guidance data source 618). Control circuitry 504 may generate a query to the database comprising a unique identifier for each user of the plurality of users. In response to transmitting the query, control circuitry 504 may receive a response from the database comprising metadata associated with the user profile, such as a viewing history associated the user or a listing of media characteristics preferred by the user.

At 806, control circuitry 504 determines, based on metadata from each respective profile, a subset of the plurality of users that have partially progressed through a synchronized viewing of a collection of non-live content from the OTT provider. For example, control circuitry 504 may identify a subset of users that are in a synchronized viewing session based on retrieving data from content provider 206 (e.g., via communications network 614) identifying a plurality of users that are in the synchronized viewing session. In another example, control circuitry 504 may retrieve a plurality of user profiles associated with each user of the plurality of users (e.g., by transmitting a request to media guidance data source 618 via communications network 614 requesting the user profiles and receiving the user profiles in response to transmitting the request or by accessing a user profile stored on storage 508). Control circuitry 504 may analyze each of the user profiles to determine whether metadata associated with each of the user profiles matches a synchronized viewing group. For example, control circuitry 504 may determine that a first user profile comprises an identification that a first user associated with the first user profile participates in a synchronized viewing session for Game of Thrones and that a second user profile comprises an identification that a second user associated with the second user profile also participates in a same synchronized viewing session for Game of Thrones (e.g., based on determining that the first user profile and the second user profile, retrieved from storage 508 and/or media guidance data source 618, both comprise a unique identifier for the synchronized viewing session). In response to determining that the first user and the second user are in a same synchronized viewing group, control circuitry 504 may select the first user and the second user to include in the subset of users (e.g., because the first user and the second user are part of a synchronized viewing session and may therefore wish to continue the synchronized viewing session when they are disinterested in live OTT content).

At 808, control circuitry 504 determines respective preferences of each respective user of the subset based on the metadata from each respective profile. For example, control circuitry 504 may retrieve a user profile for each user of the subset of users as described above (e.g., from storage 508 and/or media guidance data source 618 via communications network 614). For example, control circuitry 504 may identify a user based on a unique identifier associated with the user such as an email of the user, username or a sequence of alphanumeric characters. Control circuitry 504 may transmit the unique identifier along with a request to retrieve some or all of the user profile from a database storing the user's profile information (e.g., database on storage 508 and/or media guidance data source 618 via communications network 614). For example, control circuitry 504 may transmit the unique identifier for the user along with a request for the user profile over communications network 614 to media guidance data source 618. In response to transmitting the request, control circuitry 504 may receive the requested user profile. Control circuitry 504 may request, either in bulk or individually, a profile for each user of the plurality of users in the subset (e.g., by transmitting an array of unique user identifiers to the database of user profiles or by looping through each user in the subset and transmitting a plurality of requests for each user to the database). Based on receiving the user profiles for each user of the subset of users, control circuitry 504 may identify preferences for each of the users. Control circuitry 504 may identify preferences stored in the user profile (e.g., a preference provided by the user that identifies a preference for a specific sports team) or inferred preferences (e.g., preferences for a sports team that are inferred by control circuitry 504 based on determining that the user watches most matches that include the sports team).

At 810, control circuitry 504 determines an intersection of each of the respective preferences of each respective user in the subset. For example, control circuitry 504 may determine preferences for each user of the subset of users as described above. Control circuitry 504 may compare the preferences of each of the users to determine which preferences are most prevalent across the subset of users. For example, control circuitry 504 may determine that each user in the subset of users prefers action content and may determine that only one user of the subset prefers documentary content (e.g., based on summing the amount of times that a preference for action and a preference for documentary content appear in each profile of the subset of users).

At 812, control circuitry 504 determines an attribute of a current segment of the live content. For example, control circuitry 504 may receive metadata associated with the live OTT content via communications network 614 from content server 206. Control circuitry 504 may receive the metadata either in a same data stream as the live OTT content or over a separate data stream (e.g., by requesting the metadata from the OTT content provider and receiving a response from the OTT content provider via communications network 614 in response to transmitting the query). In another example, control circuitry 504 may perform an image-processing algorithm on frames of the live OTT content (e.g., frames generated for display to a user on display 512 of first user equipment 208, second user equipment 210, wireless user communications device 606, user television equipment 602, and/or user computer equipment 604) to detect a transition to a new segment of the live OTT content. Control circuitry 504 may identify an end of a new segment based on performing the same image-processing algorithm and detecting a transition from a previous segment to the new segment (e.g., based on determining a most prominent color in the frame and detecting a transition when the most prominent color changes).

At 814, control circuitry 504 compares the attribute to the intersection of preferences to determine whether the attribute matches the intersection of preferences. For example, control circuitry 504 may identify the attribute (e.g., that a segment of the live OTT content corresponds to commercials) and may compare the attribute to the preferences of the users (e.g., a preference for football content). In the above example, control circuitry 504 may determine that the attribute does not match the intersection of preferences because a commercial is not the football game.

At 816, control circuitry 504 determines whether the attribute matches the intersection of preferences. As described above, control circuitry 504 may compare the attribute (e.g., that a segment of the live OTT content corresponds to a commercial) to the preferences of the users (e.g., a preference for football content and a preference for not watching commercials). When control circuitry 504 determines that the attribute does not match the intersection of preferences (e.g., when the attribute is a commercial and the preference is for not watching commercials), control circuitry 504 proceeds to 818 where control circuitry 504 transmits replacement content (e.g., from media guidance data source 618 or content server 206 via communication network 614) to the subset of users (e.g., a first user associated with first user equipment 208). When control circuitry 504 determines that the attribute does match the intersection of preferences (e.g., when the attribute is the football game and the users have a preference for football content), control circuitry 504 proceeds to 824, where control circuitry 504 continues to transmit to the plurality of users (e.g., a second user associated with second user equipment 210) the segment of live content (e.g., from media guidance data source 618 or content server 206 via communication network 614).

At 818, control circuitry 504 retrieves from the database a bookmarked progress point that corresponds to the synchronized viewing. For example, control circuitry 504 may transmit a query over communications network 614 to media guidance data source 618 or content server 206 comprising the unique identifier for the synchronized viewing group (e.g., a number identifying the subset of users that participate in the synchronized viewing, or a collection of data representing the synchronized viewing group such as an array of users included in the group and an identifier for a media asset series associated with the synchronized viewing). In response to transmitting the query, control circuitry 504 may receive (e.g., from media guidance data source 618 via communications network 614) a response comprising information about the synchronized viewing session such as a bookmarked position within a series of media assets (e.g., a season number, episode number, and/or time position within an episode) indicating the point to which media was last consumed by the subset of users during the last synchronized viewing session.

At 820, control circuitry 504 transmits, to each user of the subset, an identical portion of the non-live OTT content in place of the segment of the live content, beginning at the bookmarked position while continuing to transmit to the other users of the plurality of users the segment of the live content. For example, control circuitry 504 may retrieve (e.g., from media guidance data source 618 over communications network 614 or from storage 508) the bookmarked position identifying a last episode of a series that was viewed by the subset of users during a most recent viewing session. In response to receiving the bookmarked position, control circuitry 504 may retrieve a media asset corresponding to the bookmarked position (e.g., a next episode in the series of media assets) and may transmit or initiate a transmission from content server 206 and/or media content source 616 via communications network 614 to the equipment of users in the subset (e.g., first user equipment 208 associated with a first user who is included in the subset). Control circuitry 504 may continue to transmit, to the other users of the plurality of users that are not part of the subset, the segment of the live content (e.g., from media guidance data source 618 or content server 206 via communications network 614). For example, control circuitry 504 may continue to transmit to each of the plurality of users that are not part of the subset the live OTT content from content server 206 and/or media content source 615 via communications network 614 to, for example, second user equipment 210 (e.g., because a user associated with second user equipment 210 may not be part of the synchronized viewing group).

At 822, control circuitry 504 may continue to transmit to the plurality of users the segment of the live content. For example, control circuitry 504 may continue to transmit to each user of the plurality of users (e.g., including the segment of users) the live OTT content when an attribute of the segment of the live OTT content matches an intersection of a preference of the users in the subset (e.g., the users in the segment may be interested in watching the content when it matches a preference of the users, and transmitting that content to the users will ensure that they do not miss the content). For example, control circuitry 504 may continue to transmit to first user equipment 208 and second user equipment 210 the same live OTT content from content provider 206 via communications network 614 in response to determining that the subset of users (e.g., a user associated with first user equipment 208 has a preference that matches an attribute of the segment).

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 1, 2, 5, and 6 could be used to implement one or more portions of the process.

Figure 9:
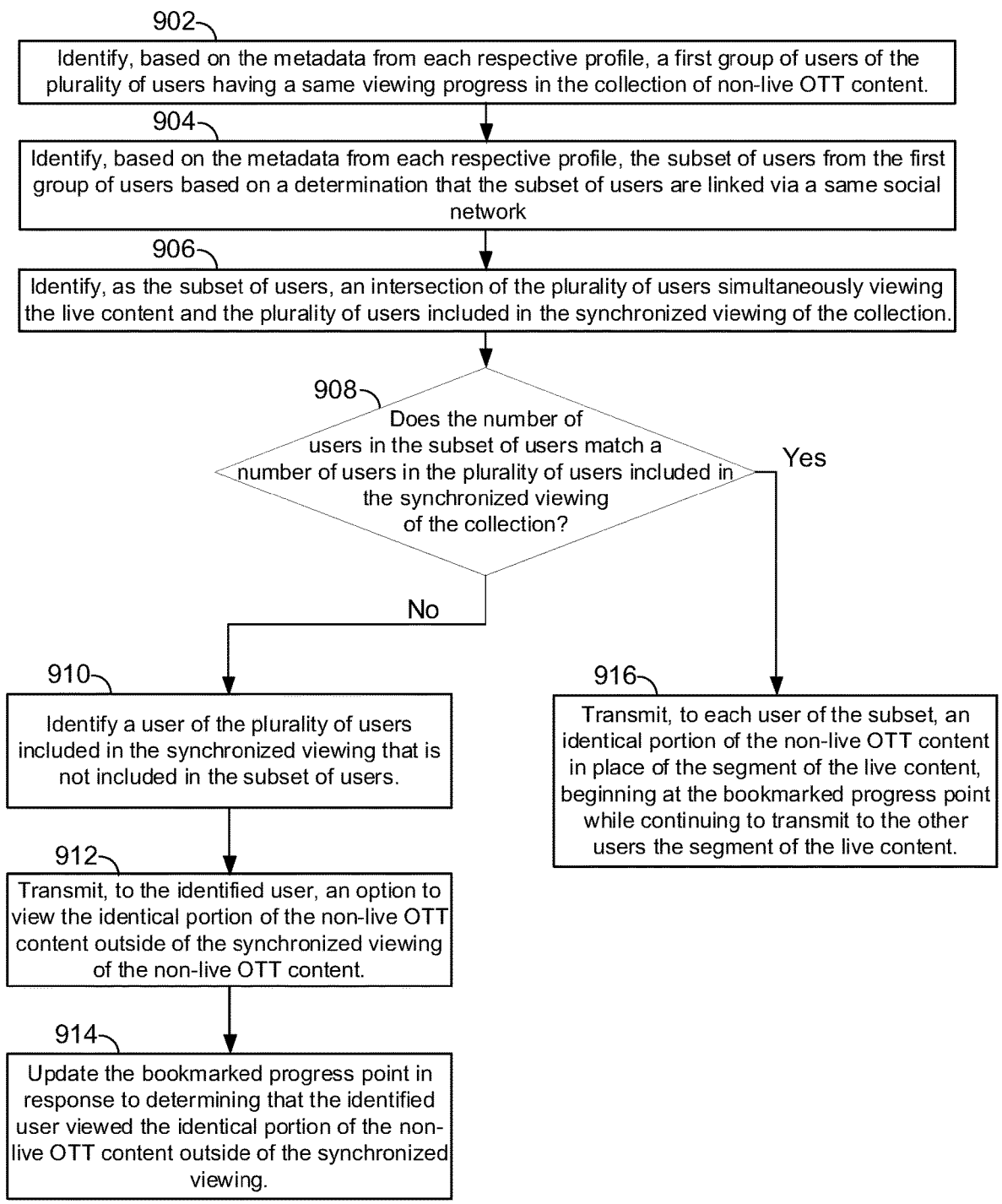
FIG. 9 depicts an illustrative process for presenting a synchronized viewing of non-live OTT content to users, in accordance with some embodiments of this disclosure.

FIG. 9 is a flowchart of illustrative steps for presenting a synchronized viewing of non-live OTT content to users. For example, a media guidance application implementing process 600 may be executed by control circuitry 504. In some embodiments, instructions for executing process 900 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 900, or any step thereof, could be performed on, or provided by, any of the devices shown in FIGS. 1, 2, 5, and 6.

Process 900 begins at 902, where the media guidance application (e.g., via control circuitry 504) identifies, based on the metadata from each respective profile, a first group of users of the plurality of users having a same viewing progress in the collection of non-live OTT content. For example, control circuitry 504 may retrieve the plurality of user profiles from local storage, such as storage 508, or from remote storage, such as media guidance data source 618. In response to receiving the user profile of the plurality of users, control circuitry 504 may receive from each user profile of the plurality of user profiles a respective viewing progress in a collection of non-live OTT content. For example, control circuitry 504 may retrieve from each user profile of the plurality of user profiles an amount of progress (e.g., an episode number) that a respective user has made in a television series such as The Wire. Based on receiving the user profiles, control circuitry 504 may compare a viewing progress that each user has made in the collection of non-live OTT content and may identify a group of users having a same viewing progress (e.g., a group of users that have watched up through the third episode in the second season of The Wire).

At 904, control circuitry 504 identifies, based on the metadata from each respective profile, the subset of users from the first group of users based on a determination that the subset of users are linked via a same social network. For example, control circuitry 504 may receive, from each respective user profile of the plurality of user profiles associated with the respective user of the plurality of users (e.g., a profile stored on storage 508 or on media guidance data source 618), a respective social network associated with the respective user. For example, control circuitry 504 may receive, from a profile of a user, a user's Facebook social network (e.g., Facebook profile data indicating friendships with other users, groups in which the user participates, chat rooms, etc.) and may identify a subset of the group of users that are in a same social network (e.g. control circuitry 504 may identify users from the group of users that are in a same chat room associated with the collection of non-live OTT content, such as the television series The Wire).

At 906, control circuitry 504 identifies as the subset of users an intersection of the plurality of users simultaneously viewing the live content and the plurality of users included in the synchronized viewing of the collection. For example, control circuitry 504 may transmit a query to content server 206 via communication network 614 requesting user profiles associated with active streams of the non-live OTT content. In response to transmitting the query, control circuitry 504 may receive an identification of the users that are streaming the live OTT content. Control circuitry 504 may compare the users identified as accessing the stream and those that are included in the same social network and may select each of the identified users as the subset of users that are part of a same synchronized viewing of the collection of non-live OTT content (e.g., because users that are in a same social network and have a same progress through the non-live OTT content likely want to maintain a same progress when viewing the non-live OTT content). For example, control circuitry 504 may determine that five users are in a same social network chat room directed to discussing The Wire. Control circuitry 504 may determine whether those five users are streaming the live OTT content, and if control circuitry 504 determines that those five users are streaming the live OTT content, control circuitry 504 may select those five users as part of the same synchronized viewing group.

At 908, control circuitry 504 determines whether the number of users in the subset of users matches a number of users in the plurality of users indicated in the synchronized viewing of the collection. For example, control circuitry 504 may determine whether all users that are part of the synchronized viewing are present in the subset by comparing data identifying each user in the synchronized viewing group to those that users that are viewing the live OTT content. For example, control circuitry 504 may determine that the number of users in the subset does not match all of the users in the synchronized viewing group (e.g., the five users) when only four of those users are currently viewing the live OTT content (e.g., based on data received by control circuitry 504 from content provider 206 indicating that four users have active streams of the live OTT content). If control circuitry 504 determines that the number of users in the subset of users matches a number of users in the plurality of viewers included in the synchronized viewing, control circuitry 504 proceeds to 916, where control circuitry 504 control circuitry 504 transmits replacement content to the subset of users. If control circuitry 504 determines that the number of users in the subset does not match a number of users in the synchronized viewing (e.g., not all of the users in the synchronized viewing are consuming the live OTT content), control circuitry 504 proceeds to 910, where control circuitry 504 transmits replacement content to those viewers that are consuming the live OTT content and provides an opportunity for any users that are not consuming the live OTT content to catch up to other users.

At 910, control circuitry 504 identifies a user of the plurality of users included in the synchronized viewing that is not included in the subset of users. For example, control circuitry 504 may determine that five users are included in the synchronized viewing (e.g., based on determining that five users are included in the chat group discussing The Wire). Control circuitry 504 may determine that of those five users, only four of them are consuming the live OTT content. Control circuitry 504 may identify the user based on the determination that the user is not viewing the live OTT content but is part of the chat group.

At 912, control circuitry 504 transmits, to the identified user, an option to view the identical portion of the non-live OTT content outside of the synchronized viewing of the non-live OTT content. For example, control circuitry 504 may transmit to each user viewing the live OTT content an identical portion of the non-live OTT content so that subset of users may view the non-live OTT content in place of a portion of the live OTT content that is not interesting to the subset. Control circuitry 504 may transmit to the identified user an option for that user to catch up to the users in the subset by enabling the identified user to catch up to the other users outside of the synchronized viewing. For example, control circuitry 504 may transmit an option to the user to view the identical portion at a time chosen by the identified user (e.g., from media guidance data source 618 or content server 602 via communications network 614).

At 914, control circuitry 504 updates the bookmarked progress point in response to determining that the identified user viewed the identical portion of the non-live OTT content outside of the synchronized viewing. For example, control circuitry 504 may determine that the identified user selected the option to consume the identical portion (e.g., by accessing a media guidance application associated with user equipment of the identified user). In response to determining that the identified user consumed the identical portion, control circuitry 504 may update the bookmarked progress point by accessing storage 508 or media guidance data source 618 and updating a memory location associated with the bookmark (e.g., by updating the memory location to include a season number, episode number, and time within the episode corresponding to an end of the identical portion.

At 916, control circuitry 504 transmits, to each user of the subset, an identical portion of the non-live OTT content in place of the segment of the live content beginning at the bookmarked progress point while continuing to transmit to the other users of the plurality of users the segment of the live content. For example, control circuitry 504 may determine that all users of the synchronized viewing are included in the subset (e.g., are also viewing the live OTT content) and may then transmit to the subset of users the identical portion (e.g., from media guidance data source 618 via communications network 614). For example, control circuitry 504 may transmit from content provider 206 the identical portion of the non-live OTT content via communications network 614 to user equipment such as first user equipment 208 and any other user equipment associated with the other users of the subset. Control circuitry 504 continues to transmit, to the other users of the plurality of users that are not part of the subset, the segment of the live content. For example, control circuitry 504 may transmit from content provider 206 and/or media content source 616 to the other users of the plurality of users, such as a user associated with second user equipment 210, the segment of the live content while the users in the subset (e.g., a user associated with first user equipment 208).

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 1, 2, 5, and 6 could be used to implement one or more portions of the process.

Figure 10:
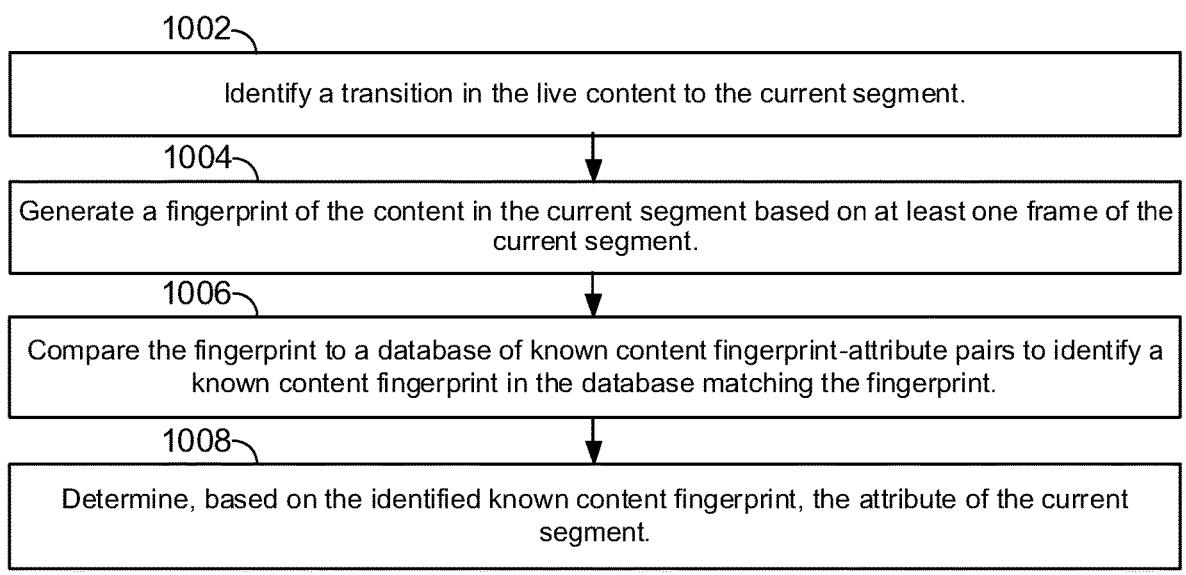
FIG. 10 depicts an illustrative process for identifying an attribute of a segment of live OTT content, in accordance with some embodiments of this disclosure.

FIG. 10 is a flowchart of illustrative steps for identifying an attribute of a segment of live OTT content. For example, a media guidance application implementing process 600 may be executed by control circuitry 504. In some embodiments, instructions for executing process 1000 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 1, 2, 5, and 6.

Process 1000 begins at 1002, where the media guidance application (e.g., via control circuitry 504) identifies a transition in the live content to the current segment. For example, as discussed above, control circuitry 504 may receive metadata that identifies the transitions between segments, such as data received via communications network 614 from media guidance data source 618 or media content source 616 identifying a transition between a first scene of the live OTT content to a second scene of the live OTT content (e.g., data indicating that a football game is occurring in the live OTT content or that a commercial is occurring in the live OTT). In another example, control circuitry 504 may process frames of the live OTT content to identify a transition to a new segment. For example, control circuitry 504 may identify objects in the frame of the segment and may determine that once a threshold number of objects in the frame changes, there is a transition to a new segment. For example, control circuitry 504 may detect a plurality of football players in a first frame and a car in a second frame; because football players and a car would not likely be in a same scene, control circuitry 504 may determine that there was a transition to a new segment of the live OTT content.

At 1004, control circuitry 504 generates a fingerprint of the content in the current segment based on at least one frame of the current segment. For example, control circuitry 504 may generate a fingerprint for the segment based on, for example, applying a hashing algorithm to the frame that creates a unique value created based on at least one of an image and/or sound associated with the frame of the current segment. For example, control circuitry 504 may generate a fingerprint for the frame based on the RGB value and location of pixels in the frame of the live OTT content. In some embodiments, control circuitry 504 may generate a fingerprint based on a portion of the frame, such as of a detected object within the frame. For example, control circuitry 504 may apply an edge detection algorithm to the frame to detect the edges of objects within the frame and may generate a fingerprint for individual objects (e.g., to identify what the object is within the frame). Control circuitry 504 may generate the fingerprint for the frame based on the detected objects. For example, control circuitry 504 may detect ten football players in the frame and a score of 21 to 14 and may generate a fingerprint based on detecting the ten football players and the score.

At 1006, control circuitry 504 compares the fingerprint to a database of known content fingerprint-attribute pairs to identify a known content fingerprint in the database matching the fingerprint. For example, control circuitry 504 may detect the ten football players in the frame as described above. In response to detecting the ten football players, control circuitry 504 may transmit a fingerprint representing the ten football players to a database of known fingerprint attribute pairs (e.g., via communications network 614 to storage 508 or to media guidance data source 618). In response to the transmitting, control circuitry 504 may receive an indication of whether there is a matching fingerprint attribute pair in the database. For example, control circuitry 504 may transmit a fingerprint or multiple fingerprints representing the ten football players and in response to the transmitting may receive an indication from the database (e.g., storage 508 or media guidance data source 618) identifying the object or objects in the frame (e.g., the individual football players or an indication that the frame corresponds to a football game).

At 1008, control circuitry 504 determines, based on the identified known content fingerprint, the attribute of the current segment. For example, when control circuitry 504 receives a response from the database, control circuitry 504 may determine that the attribute associated with the fingerprint is the attribute of the segment. For example, if control circuitry 504 receives an indication that the frame comprises football content (e.g., based on transmitting the fingerprint to the database) control circuitry 504 may determine that the segment comprises football content.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 1, 2, 5, and 6 could be used to implement one or more portions of the process.

FIG. 11 is a flowchart of illustrative steps for identifying an intersection of user preferences for the subset of users. For example, a media guidance application implementing process 600 may be executed by control circuitry 504. In some embodiments, instructions for executing process 1100 may be encoded onto a non-transitory storage medium (e.g., storage 508) as a set of instructions to be decoded and executed by processing circuitry (e.g., processing circuitry 506). Processing circuitry may, in turn, provide instructions to other sub-circuits contained within control circuitry 504, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 1, 2, 5, and 6.

Process 1100 begins at 1102, where the media guidance application (e.g., via control circuitry 504) retrieves, based on the metadata from each respective profile, respective viewing histories comprising a plurality of media assets viewed by each user of the subset of users. For example, control circuitry 504 may retrieve a unique identifier for each user of the subset of users as discussed above. Control circuitry 504 may transmit a query comprising the unique identifier and a request for the user profile to a database comprising a user profile, such as local storage 508) on a device associated with a user or network-based storage, such as a profiles stored on media guidance data source 618. In response to transmitting the query, control circuitry 504 may receive a response from the database comprising the profile information for each user of the subset.

At 1104, control circuitry 504 identifies, based on the respective viewing histories, respective characteristics corresponding to the plurality of media assets in the respective viewing histories for each user of the subset of users. For example, control circuitry 504 may receive, from the plurality of user profiles, a viewing history from each of the user profiles (e.g., a history of media assets accessed by a respective user associated with the respective user profile). Based on a listing of media assets in the viewing histories, control circuitry 504 may request metadata associated with the media assets (e.g., by retrieving the metadata that is already stored in the profile or by requesting metadata associated with the media asset from media guidance data source 618 via communications network 614).

At 1106, control circuitry 504 identifies a characteristic matching at least one of the respective characteristics corresponding to the plurality of media assets in the respective viewing histories for each user of the subset of users. For example, control circuitry 504 may analyze the metadata of the media assets that are in the viewing histories of the subset of users to identify a characteristic that is persistent throughout each of the viewing histories. For example, control circuitry 504 may determine that three out of the five users in the subset like dramas, four out of five like country music, and five out of five like football. Control circuitry 504 may determine football to be the characteristic because it is characteristic that is present in the viewing history of each of the users of the subset.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 1, 2, 5, and 6 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a plurality of users that are viewing live content from an over-the-top (OTT) provider;
   determining a subset of the plurality of users that have partially progressed through a synchronized viewing of a collection of non-live content from the OTT provider;
   determining an intersection of preferences of each user of the subset;
   determining, based on the intersection of preferences, that the live content has reached a segment that is uninteresting to the subset; and
   in response to determining that the live content has reached the segment that is uninteresting to the subset, playing back the synchronized viewing of the collection from a bookmarked progress point within the collection to each user of the subset, while continuing to play back the live content to other users of the plurality of users who are not part of the subset.

2. A method for replacing a segment of live content from an over-the-top (OTT) provider with a segment of non-live content from the OTT provider for a subset of users that is both disinterested in the segment of live content, and also part of a same synchronized viewing group, the method comprising:
   determining a plurality of users that are simultaneously viewing live content from an OTT provider;
   retrieving a respective profile corresponding to each user of the plurality of users from a database;
   determining, based on metadata from each respective profile, a subset of the plurality of users that have partially progressed through a synchronized viewing of a collection of non-live content from the OTT provider;
   determining respective preferences of each respective user of the subset based on the metadata from each respective profile;
   determining an intersection of each of the respective preferences of each respective user in the subset;
   determining an attribute of a current segment of the live content;
   comparing the attribute to the intersection of preferences to determine whether the attribute matches the intersection of preferences; and
   in response to determining that the attribute does not match the intersection of preferences:
      retrieving, from the database, a bookmarked progress point that corresponds to the synchronized viewing;
      transmitting, to each user of the subset, an identical portion of the non-live OTT content in place of the segment of the live content, beginning at the bookmarked progress point; and
      continuing to transmit, to the other users of the plurality of users that are not part of the subset, the segment of the live content.

3. The method of claim 2, wherein determining, based on the metadata from each respective profile, the subset of the plurality of users comprises:
   identifying, based on the metadata from each respective profile, a first group of users of the plurality of users having a same viewing progress in the collection of non-live OTT content; and
   identifying, based on the metadata from each respective profile, the subset of users from the first group of users based on a determination that the subset of users are linked via a same social network.

4. The method of claim 2, wherein determining, based on the metadata from each respective profile, the subset of the plurality of users comprises:
   retrieving, from the metadata, an indication of a plurality of users included in the synchronized viewing of the collection of non-live content from the OTT provider; and
   identifying, as the subset of users, an intersection of the plurality of users simultaneously viewing the live content and the plurality of users included in the synchronized viewing of the collection.

5. The method of claim 4, further comprising:
   determining whether a number of users in the subset of users matches a number of users in the plurality of users included in the synchronized viewing of the collection; and
   in response to determining that the number of users in the subset of users is less than the number of users in the plurality of users included in the synchronized viewing:
      identifying a user of the plurality of users included in the synchronized viewing that is not included in the subset of users; and
      transmitting, to the identified user, an option to view the identical portion of the non-live OTT content outside of the synchronized viewing of the non-live OTT content.

6. The method of claim 5, further comprising updating the bookmarked progress point in response to determining that the identified user viewed the identical portion of the non-live OTT content outside of the synchronized viewing.

7. The method of claim 4, further comprising:
   determining whether a number of users in the subset of users matches a number of users in the plurality of users included in the synchronized viewing of the collection; and
   in response to determining that the number of users in the subset of users is less than the number of users in the plurality of users included in the synchronized viewing:

identifying, from a collection of media assets associated with the OTT provider, a media asset, from the collection of media assets, matching the intersection of preferences; and where transmitting, to each user of the subset, an identical portion of the non-live OTT content in place of the segment of the live content comprises transmitting an identical portion of the media asset.

8. The method of claim 2, wherein a runtime of the identical portion of the non-live OTT content matches a runtime of the segment of the live content.

9. The method of claim 2, wherein determining the attribute of the current segment of the live content comprises:

identifying a transition in the live content to the current segment;

in response to identifying the transition, generating a fingerprint of the content in the current segment based on at least one frame of the current segment;

comparing the fingerprint to a database of known content fingerprint-attribute pairs to identify a known content fingerprint in the database matching the fingerprint;

determining, based on the identified known content fingerprint, the attribute of the current segment.

10. The method of claim 2, wherein determining an intersection of each of the respective preferences of each respective user in the subset comprises:

retrieving, based on the metadata from each respective profile, respective viewing histories comprising a plurality of media assets viewed by each user of the subset of users;

identifying, based on the respective viewing histories, respective characteristics corresponding to the plurality of media assets in the respective viewing histories for each user of the subset of users; and identifying a characteristic matching at least one of the respective characteristics corresponding to the plurality of media assets in the respective viewing histories for each user of the subset of users.

11. The method of claim 2, further comprising, continuing to transmit to the plurality of users the segment of the live content in response to determining that the attribute does match the intersection of preferences.

12. A system for replacing a segment of live content from an over-the-top (OTT) provider with a segment of non-live content from the OTT provider for a subset of users that is both disinterested in the segment of live content, and also part of a same synchronized viewing group, the system comprising control circuitry configured to:

determine a plurality of users that are simultaneously viewing live content from an OTT provider;

retrieve a respective profile corresponding to each user of the plurality of users from a database;

determine, based on metadata from each respective profile, a subset of the plurality of users that have partially progressed through a synchronized viewing of a collection of non-live content from the OTT provider;

determine respective preferences of each respective user of the subset based on the metadata from each respective profile;

determine an intersection of each of the respective preferences of each respective user in the subset;

determine an attribute of a current segment of the live content;

comparing the attribute to the intersection of preferences to determine whether the attribute matches the intersection of preferences; and in response to determining that the attribute does not match the intersection of preferences:

retrieve, from the database, a bookmarked progress point that corresponds to the synchronized viewing;

transmit, to each user of the subset, an identical portion of the non-live OTT content in place of the segment of the live content, beginning at the bookmarked progress point; and continue to transmit, to the other users of the plurality of users that are not part of the subset, the segment of the live content.

13. The system of claim 12, wherein the control circuitry is further configured, when determining, based on the metadata from each respective profile, the subset of the plurality of users, to:

identify, based on the metadata from each respective profile, a first group of users of the plurality of users having a same viewing progress in the collection of non-live OTT content; and identify, based on the metadata from each respective profile, the subset of users from the first group of users based on a determination that the subset of users are linked via a same social network.

14. The system of claim 12, wherein the control circuitry is further configured, when determining, based on the metadata from each respective profile, the subset of the plurality of users to:

retrieve, from the metadata, an indication of a plurality of users included in the synchronized viewing of the collection of non-live content from the OTT provider; and identify, as the subset of users, an intersection of the plurality of users simultaneously viewing the live content and the plurality of users included in the synchronized viewing of the collection.

15. The system of claim 14, wherein the control circuitry is further configured to:

determine whether a number of users in the subset of users matches a number of users in the plurality of users included in the synchronized viewing of the collection; and in response to determining that the number of users in the subset of users is less than the number of users in the plurality of users included in the synchronized viewing:

identify a user of the plurality of users included in the synchronized viewing that is not included in the subset of users; and transmit, to the identified user, an option to view the identical portion of the non-live OTT content outside of the synchronized viewing of the non-live OTT content.

16. The system of claim 15, wherein the control circuitry is further configured to update the bookmarked progress point in response to determining that the identified user viewed the identical portion of the non-live OTT content outside of the synchronized viewing.

17. The system of claim 14, wherein the control circuitry is further configured to:

determine whether a number of users in the subset of users matches a number of users in the plurality of users included in the synchronized viewing of the collection; and in response to determining that the number of users in the subset of users is less than the number of users in the plurality of users included in the synchronized viewing:

identify, from a collection of media assets associated with the OTT provider, a media asset, from the collection of media assets, matching the intersection of preferences; and wherein the control circuitry is further configured, when transmitting, to each user of the subset, an identical portion of the non-live OTT content in place of the segment of the live content, to transmit an identical portion of the media asset.

18. The system of claim 12, wherein a runtime of the identical portion of the non-live OTT content matches a runtime of the segment of the live content.

19. The system of claim 12, wherein the control circuitry is further configured, when determining the attribute of the current segment of the live content to:

identify a transition in the live content to the current segment;

in response to identifying the transition, generate a fingerprint of the content in the current segment based on at least one frame of the current segment;

compare the fingerprint to a database of known content fingerprint-attribute pairs to identify a known content fingerprint in the database matching the fingerprint;

determine, based on the identified known content fingerprint, the attribute of the current segment.

20. The system of claim 12, wherein the control circuitry is further configured, when determining an intersection of each of the respective preferences of each respective user in the subset to:

retrieve, based on the metadata from each respective profile, respective viewing histories comprising a plurality of media assets viewed by each user of the subset of users;

identify, based on the respective viewing histories, respective characteristics corresponding to the plurality of media assets in the respective viewing histories for each user of the subset of users; and identify a characteristic matching at least one of the respective characteristics corresponding to the plurality of media assets in the respective viewing histories for each user of the subset of users.

21. The system of claim 12, wherein the control circuitry is further configured to continue to transmit to the plurality of users the segment of the live content in response to determining that the attribute does match the intersection of preferences.

* * * * *